(12) United States Patent
Shao et al.

(10) Patent No.: US 11,381,283 B2
(45) Date of Patent: Jul. 5, 2022

(54) CODEBOOK TRANSMISSION METHOD, APPARATUS, AND SYSTEM

(71) Applicant: HUAWEI TECHNOLOGIES CO., LTD., Guangdong (CN)

(72) Inventors: Jiafeng Shao, Beijing (CN); Lei Guan, Beijing (CN); Xinghua Song, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 84 days.

(21) Appl. No.: 16/994,281

(22) Filed: Aug. 14, 2020

(65) Prior Publication Data

US 2020/0382174 A1    Dec. 3, 2020

Related U.S. Application Data

(63) Continuation of application No. PCT/CN2019/074934, filed on Feb. 13, 2019.

(30) Foreign Application Priority Data

Feb. 14, 2018 (CN) .......................... 201810152135.8

(51) Int. Cl.
*H04B 7/0417* (2017.01)
*H04B 7/0456* (2017.01)
(Continued)

(52) U.S. Cl.
CPC ......... *H04B 7/0417* (2013.01); *H04B 7/0456* (2013.01); *H04W 72/042* (2013.01); *H04W 72/1289* (2013.01)

(58) Field of Classification Search
CPC . H04B 7/0417; H04B 7/0456; H04W 72/042; H04W 72/1289
See application file for complete search history.

(56) References Cited

U.S. PATENT DOCUMENTS

2012/0320805 A1* 12/2012 Yang ..................... H04L 5/0092
                                                           370/280
2014/0105191 A1*  4/2014 Yang ..................... H04L 1/1867
                                                           370/336
(Continued)

FOREIGN PATENT DOCUMENTS

CN   103378889 A   10/2013
CN   103516487 A    1/2014
(Continued)

OTHER PUBLICATIONS

CATT, "Discussion on HARQ management and HARQ-ACK feedback," 3GPP TSG RAN WG1 Meeting #90bis,R1-1717834, Prague, CZ, Oct. 9-13, 2017, 7 pages.

(Continued)

*Primary Examiner* — Jael M Ulysse
(74) *Attorney, Agent, or Firm* — Fish & Richardson P.C.

(57) ABSTRACT

Methods, systems, and apparatus for codebook transmission are provided. In one aspect, a method includes receiving at least one downlink transmission and indication information corresponding to the at least one downlink transmission and generating a codebook including at least one piece of feedback information corresponding to the at least one downlink transmission. The at least one downlink transmission includes a target downlink transmission corresponding to an actual occasion and a pair of a target frequency domain resource and a reference occasion. A location of feedback information corresponding to the target downlink transmission in the codebook corresponds to indication information corresponding to the target downlink transmission. The actual occasion includes a physical downlink control channel (PDCCH) monitoring occasion at which downlink control information (DCI) for scheduling or carrying the target downlink transmission is located or a physical downlink (Continued)

shared channel (PDSCH) reception occasion at which the target downlink transmission is located.

20 Claims, 7 Drawing Sheets

(51) Int. Cl.
*H04W 72/04* (2009.01)
*H04W 72/12* (2009.01)

(56) References Cited

U.S. PATENT DOCUMENTS

| | | | |
|---|---|---|---|
| 2015/0358986 A1* | 12/2015 | Yang | H04L 1/1854 370/280 |
| 2017/0273056 A1* | 9/2017 | Papasakellariou | H04W 72/042 |
| 2017/0367046 A1* | 12/2017 | Papasakellariou | H04L 5/0048 |
| 2018/0006790 A1* | 1/2018 | Park | H04L 1/1671 |
| 2018/0019843 A1* | 1/2018 | Papasakellariou | H04W 72/1278 |
| 2018/0310257 A1* | 10/2018 | Papasakellariou | H04W 52/50 |
| 2019/0150181 A1* | 5/2019 | Kim | H04W 72/1289 370/329 |
| 2020/0374045 A1* | 11/2020 | Yin | H04W 72/042 |

FOREIGN PATENT DOCUMENTS

| | | |
|---|---|---|
| CN | 106856413 A | 6/2017 |
| WO | 2017024532 A1 | 2/2017 |

OTHER PUBLICATIONS

Extended European Search Report issued in European Application No. 19755151.8 dated Mar. 22, 2021, 16 pages.
Huawei, HiSilicon, Other issues on NR CA and DC including SRS switching and SUL. 3GPP TSG RAN WG1 Meeting #90bis, R1-1717080, Prague, Czech Republic, Oct. 9-13, 2017, 9 pages.
3GPP TS 38.213 V15.0.0 (Dec. 2017), "3rd Generation Partnership Project;Technical Specification Group Radio Access Network;NR;Physical layer procedures for control(Release 15)," Dec. 2017, 56 pages.
Fujitsu, "Clarification on Type-2 HARQ-ACK codebook determination in TS," 3GPP TSG RAN WG1 Meeting AH 1801, R1-1800128, Vancouver, Canada, Jan. 22-26, 2018, 10 pages.
Office Action issued in Chinese Application No. 201810152135.8 dated Apr. 9, 2020, 10 pages (with English translation).
Office Action issued in Chinese Application No. 201810152135.8 dated Jun. 28, 2020, 6 pages (with English translation).

* cited by examiner

CODEBOOK TRANSMISSION METHOD, APPARATUS, AND SYSTEM

CROSS-REFERENCE TO RELATED APPLICATIONS

This application is a continuation of International Application No. PCT/CN2019/074934, filed on Feb. 13, 2019, which claims priority to Chinese Patent Application No. 201810152135.8, filed on Feb. 14, 2018. The disclosures of the aforementioned applications are hereby incorporated by reference in their entireties.

TECHNICAL FIELD

This application relates to the field of communications technologies, and in particular, to a codebook transmission method, an apparatus, and a system.

BACKGROUND

In a next-generation radio access network (NR), a network device sends a physical downlink control channel (PDCCH) that carries downlink control information (DCI) to a terminal device. The PDCCH may be used to schedule a physical downlink shared channel (PDSCH) that carries downlink data, or may be used to indicate semi-persistent scheduling (SPS) activation or release.

In an NR system, the DCI includes a counter downlink assignment indicator (C-DAI), and may further include a total downlink assignment indicator (T-DAI). The C-DAI is used to indicate a quantity of pairs of a serving cell and a PDCCH monitoring occasion up to a current serving cell and a current PDCCH monitoring occasion, and the T-DAI is used to indicate a total quantity of pairs of a serving cell and a PDCCH monitoring occasion up to a current PDCCH monitoring occasion. T-DAI values corresponding to downlink transmissions in different serving cells at a same PDCCH monitoring occasion are the same. A C-DAI value corresponding to a downlink transmission is generated through sequencing performed in ascending order of serving cell index, and C-DAI values corresponding to downlink transmissions in different serving cells are different, where the downlink transmission may be a PDSCH or SPS release indication command.

Before sending a downlink transmission, the network device needs to prepare DCI corresponding to the downlink transmission. The DCI includes a C-DAI, or includes a C-DAI and a T-DAI. Downlink transmissions in at least two serving cells at a same PDCCH monitoring occasion correspond to a same T-DAI. Therefore, when preparing DCI corresponding to each downlink transmission, the network device needs to know existence of another to-be-sent downlink transmission. However, in an actual application scenario, if preparation times required for to-be-sent downlink transmissions are different, for example, a preparation time required for a first downlink transmission is long, and a preparation time required for a second downlink transmission is short, when the network device prepares DCI for the first downlink transmission, the network device cannot know that the second downlink transmission is also to be sent. Consequently, the DCI corresponding to the first downlink transmission and DCI corresponding to the second downlink transmission cannot be used to generate a C-DAI and a T-DAI that meet a prior-art arrangement rule.

SUMMARY

To resolve a technical problem, this application provides a codebook transmission method, an apparatus, and a system, to provide a new manner of generating a C-DAI and a T-DAI.

In view of this, technical solutions of this application for resolving the technical problem are as follows:

According to a first aspect of the embodiments of this application, a codebook receiving method is provided, where the method includes:

sending at least one downlink transmission and indication information corresponding to the at least one downlink transmission, where the at least one downlink transmission includes a target downlink transmission, the target downlink transmission corresponds to an actual occasion, the target downlink transmission corresponds to a pair of a target frequency domain resource and a reference occasion, the reference occasion is an occasion obtained after the actual occasion corresponding to the target downlink transmission is offset by an occasion offset value, the indication information includes a counter downlink assignment indicator C-DAI, or the indication information includes the C-DAI and a total downlink assignment indicator T-DAI, and the target frequency domain resource is a frequency domain resource on which the target downlink transmission is located; and receiving a codebook, where the codebook includes at least one piece of feedback information corresponding to the at least one downlink transmission, and a location, of feedback information corresponding to the target downlink transmission, in the codebook corresponds to indication information that is corresponding to the target downlink transmission; where the actual occasion is a physical downlink control channel PDCCH monitoring occasion at which downlink control information DCI that is used to schedule or carry the target downlink transmission is located, or the actual occasion is a physical downlink shared channel PDSCH reception occasion at which the target downlink transmission is located.

Optionally, the method further includes:

configuring the occasion offset value via higher layer signaling or downlink control information DCI.

According to a second aspect of the embodiments of this application, a codebook generation method is provided, where the method includes:

receiving at least one downlink transmission and indication information corresponding to the at least one downlink transmission, where the at least one downlink transmission includes a target downlink transmission, the target downlink transmission corresponds to an actual occasion, the target downlink transmission corresponds to a pair of a target frequency domain resource and a reference occasion, the reference occasion is an occasion obtained after the actual occasion corresponding to the target downlink transmission is offset by an occasion offset value, and the indication information includes a counter downlink assignment indicator C-DAI, or the indication information includes the C-DAI and a total downlink assignment indicator T-DAI; and generating a codebook, where the codebook includes at least one piece of feedback information corresponding to the at least one downlink transmission, and a location, of feedback information corresponding to the target downlink transmission, in the codebook corresponds to indication information that is corresponding to the target downlink transmission; where the actual occasion is a physical downlink control channel PDCCH monitoring occasion at which downlink control information DCI that is used to schedule or carry the target downlink transmission is located, or the actual occasion is a physical downlink shared channel PDSCH reception occasion at which the target downlink transmission is located.

Optionally, the method further includes:

receiving the occasion offset value via higher layer signaling or downlink control information DCI.

Both the method provided in the first aspect and the method provided in the second aspect of the embodiments of this application include the following content:

Optionally, the pair is a current pair, a value of a C-DAI corresponding to the target downlink transmission is an accumulative quantity of pairs up to the current pair, and the current pair is a pair of a current target frequency domain resource and a current reference occasion; and the accumulative quantity of pairs is an accumulative quantity of pairs corresponding to the at least one downlink transmission that are sequenced in a first preset order, and the first preset order indicates that the pair is sequenced first in ascending order of frequency domain resource index and then in ascending order of reference occasion index.

Optionally, a value of a T-DAI corresponding to the target downlink transmission is a total quantity of pairs up to the current reference occasion, the total quantity of pairs is a value obtained after a total quantity of pairs corresponding to the target downlink transmission is updated based on a second preset order, and the second preset order is an ascending order of reference occasion index.

Optionally, the reference occasion is earlier than or equal to the actual occasion, or an index of the reference occasion is less than or equal to an index of the actual occasion.

Optionally, the target frequency domain resource is one of at least two candidate frequency domain resources, and the occasion offset value is independently configured for each of the at least two candidate frequency domain resources.

Optionally, that the occasion offset value is independently configured for each of the at least two candidate frequency domain resources includes:

the frequency domain resource is a serving cell, and the occasion offset value is independently configured for each of the at least two candidate serving cells; or the frequency domain resource is a carrier bandwidth part C-BWP of a serving cell, and the occasion offset value is independently configured for each of the at least two candidate C-BWPs.

Optionally, the occasion offset value is configured by using any one of the following implementations:

implementation 1: The actual occasion belongs to an actual occasion set, the actual occasion set includes at least two actual occasions, and the occasion offset value is independently configured for each of the at least two actual occasions in the actual occasion set;

implementation 2: The DCI that is used to schedule or carry the target downlink transmission is in one of at least two DCI formats, and the occasion offset value is independently configured for the at least two DCI formats;

implementation 3: A scheduling time interval of the target downlink transmission is one of at least two scheduling time intervals, the occasion offset value is independently configured for the at least two scheduling time intervals, and the scheduling time interval includes a time interval between a downlink transmission to a PDCCH that schedules or carries the downlink transmission;

implementation 4: A feedback time of the target downlink transmission is one of at least two feedback times, the occasion offset value is independently configured for the at least two feedback times, and the feedback time includes a time interval between a downlink transmission to feedback of feedback information corresponding to the downlink transmission; or implementation 5: The downlink transmission is a PDSCH, time domain resource information of the target PDSCH is one of at least two pieces of time domain resource information, the occasion offset value is independently configured, and the time domain resource information includes a time domain length and/or a start symbol location.

Optionally, the occasion offset value is an offset time period, the reference occasion is an occasion obtained after an actual occasion corresponding to the downlink transmission is offset by a quantity of occasions, and the quantity of occasions is a quantity of occasions within the offset time period.

Optionally, a combination of the actual occasion and the occasion offset value may be any one of the following:

combination 1: The actual occasion is the PDCCH monitoring occasion, and the occasion offset value is an occasion offset value of the PDCCH monitoring occasion;

combination 2: The actual occasion is the PDSCH reception occasion, and the occasion offset value is an occasion offset value of a candidate PDSCH reception occasion;

combination 3: The actual occasion is the PDCCH monitoring occasion, and the occasion offset value is an occasion offset value of a candidate PDSCH reception occasion; or combination 4: The actual occasion is the PDSCH reception occasion, and the occasion offset value is an occasion offset value of a PDCCH monitoring occasion.

Optionally, the target frequency domain resource is one of the at least two candidate frequency domain resources, and subcarrier spacings of the at least two candidate frequency domain resources are different; and/or at least one actual occasion periodicity on the at least two candidate frequency domain resources is different.

According to a third aspect of the embodiments of this application, a codebook receiving method is provided, where the method includes:

sending at least one first downlink transmission and indication information corresponding to the at least one first downlink transmission, where an actual time domain resource on which the first downlink transmission is located or a reference time domain resource corresponding to the first downlink transmission belongs to a first time domain resource set;

sending at least one second downlink transmission and indication information corresponding to the at least one second downlink transmission, where an actual time domain resource on which the second downlink transmission is located or a reference time domain resource corresponding to the second downlink transmission belongs to a second time domain resource set; and receiving a codebook, where the codebook includes a first sub-codebook and a second sub-codebook, the first sub-codebook includes at least one piece of first feedback information corresponding to the at least one first downlink transmission, the second sub-codebook includes at least one piece of second feedback information corresponding to the at least one second downlink transmission, a location, of the first feedback information corresponding to the first downlink transmission, in the first sub-codebook corresponds to the indication information that is corresponding to the first downlink transmission, and a location, of the second feedback information corresponding to the second downlink transmission, in the second sub-codebook corresponds to the indication information that is corresponding to the second downlink transmission.

According to a fourth aspect of the embodiments of this application, a codebook generation method is provided, where the method includes:

receiving at least one first downlink transmission and indication information corresponding to the at least one first downlink transmission, where an actual time domain resource on which the first downlink transmission is located or a reference time domain resource corresponding to the first downlink transmission belongs to a first time domain resource set;

receiving at least one second downlink transmission and indication information corresponding to the at least one second downlink transmission, where an actual time domain resource on which the second downlink transmission is located or a reference time domain resource corresponding to the second downlink transmission belongs to a second time domain resource set; and generating a codebook, where the codebook includes a first sub-codebook and a second sub-codebook, the first sub-codebook includes at least one piece of first feedback information corresponding to the at least one first downlink transmission, the second sub-codebook includes at least one piece of second feedback information corresponding to the at least one second downlink transmission, a location, of the first feedback information corresponding to the first downlink transmission, in the first sub-codebook corresponds to the indication information that is corresponding to the first downlink transmission, and a location, of the second feedback information corresponding to the second downlink transmission, in the second sub-codebook corresponds to the indication information that is corresponding to the second downlink transmission.

Both the method provided in the third aspect and the method provided in the fourth aspect of the embodiments of this application include the following content:

Optionally, the first time domain resource set is determined based on an actual subcarrier spacing of a frequency domain resource on which the first downlink transmission is located, the preset first reference subcarrier spacing, and a preset first reference time domain resource set; and/or the second time domain resource set is determined based on an actual subcarrier spacing of a frequency domain resource on which the second downlink transmission is located, the preset first reference subcarrier spacing, and a preset second reference time domain resource set.

Optionally, the reference time domain resource corresponding to the first downlink transmission is determined based on the actual time domain resource on which the first downlink transmission is located, an actual subcarrier spacing of a frequency domain resource on which the first downlink transmission is located, and the preset first reference subcarrier spacing; and/or the reference time domain resource corresponding to the second downlink transmission is determined based on the actual time domain resource on which the second downlink transmission is located, an actual subcarrier spacing of a frequency domain resource on which the second downlink transmission is located, and the preset first reference subcarrier spacing.

Optionally, a time domain resource element in the first time domain resource set is predefined; and a time domain resource element in the second time domain resource set is independently configured.

Optionally, the first sub-codebook is located before the second sub-codebook in the codebook, or the first sub-codebook is located after the second sub-codebook in the codebook.

According to a fifth aspect of the embodiments of this application, a network device is provided, where the network device includes:

a sending unit, configured to send at least one downlink transmission and indication information corresponding to the at least one downlink transmission, where the at least one downlink transmission includes a target downlink transmission, the target downlink transmission corresponds to an actual occasion, the target downlink transmission corresponds to a pair of a frequency domain resource and a reference occasion, the reference occasion is an occasion obtained after the actual occasion corresponding to the target downlink transmission is offset by an occasion offset value, and the indication information includes a counter downlink assignment indicator C-DAI, or the indication information includes the C-DAI and a total downlink assignment indicator T-DAI; and a receiving unit, configured to receive a codebook, where the codebook includes at least one piece of feedback information corresponding to the at least one downlink transmission, and a location, of feedback information corresponding to the target downlink transmission, in the codebook corresponds to indication information that is corresponding to the target downlink transmission; where the actual occasion is a physical downlink control channel PDCCH monitoring occasion at which downlink control information DCI that is used to schedule or carry the target downlink transmission is located, or the actual occasion is a physical downlink shared channel PDSCH reception occasion at which the target downlink transmission is located.

According to a sixth aspect of the embodiments of this application, a terminal device is provided, where the terminal device includes:

a receiving unit, configured to receive at least one downlink transmission and indication information corresponding to the at least one downlink transmission, where the at least one downlink transmission includes a target downlink transmission, the target downlink transmission corresponds to an actual occasion, the target downlink transmission corresponds to a pair of a frequency domain resource and a reference occasion, the reference occasion is an occasion obtained after the actual occasion corresponding to the target downlink transmission is offset by an occasion offset value, and the indication information includes a counter downlink assignment indicator C-DAI, or the indication information includes the C-DAI and a total downlink assignment indicator T-DAI; and a generation unit, configured to generate a codebook, where the codebook includes at least one piece of feedback information corresponding to the at least one downlink transmission, and a location, of feedback information corresponding to the target downlink transmission, in the codebook corresponds to indication information that is corresponding to the target downlink transmission; where the actual occasion is a physical downlink control channel PDCCH monitoring occasion at which downlink control information DCI that is used to schedule or carry the target downlink transmission is located, or the actual occasion is a physical downlink shared channel PDSCH reception occasion at which the target downlink transmission is located.

According to a seventh aspect of the embodiments of this application, a system is provided, where the system includes:

the network device according to the fifth aspect of the embodiments of this application and the terminal device according to the sixth aspect of the embodiments of this application.

According to an eighth aspect of the embodiments of this application, a network device is provided, where the network device includes:

a first sending unit, configured to send at least one first downlink transmission and indication information corresponding to the at least one first downlink transmission, where an actual time domain resource on which the first downlink transmission is located or a reference time domain resource corresponding to the first downlink transmission belongs to a first time domain resource set;

a second sending unit, configured to send at least one second downlink transmission and indication information corresponding to the at least one second downlink transmission, where an actual time domain resource on which the second downlink transmission is located or a reference time domain resource corresponding to the second downlink transmission belongs to a second time domain resource set; and a receiving unit, configured to receive a codebook, where the codebook includes a first sub-codebook and a second sub-codebook, the first sub-codebook includes at least one piece of first feedback information corresponding to the at least one first downlink transmission, the second sub-codebook includes at least one piece of second feedback information corresponding to the at least one second downlink transmission, a location, of the first feedback information corresponding to the first downlink transmission, in the first sub-codebook corresponds to the indication information that is corresponding to the first downlink transmission, and a location, of the second feedback information corresponding to the second downlink transmission, in the second sub-codebook corresponds to the indication information that is corresponding to the second downlink transmission.

According to a ninth aspect of this application, a terminal device is provided, where the terminal device includes:

a first receiving unit, configured to receive at least one first downlink transmission and indication information corresponding to the at least one first downlink transmission, where an actual time domain resource on which the first downlink transmission is located or a reference time domain resource corresponding to the first downlink transmission belongs to a first time domain resource set;

a second receiving unit, configured to receive at least one second downlink transmission and indication information corresponding to the at least one second downlink transmission, where an actual time domain resource on which the second downlink transmission is located or a reference time domain resource corresponding to the second downlink transmission belongs to a second time domain resource set; and a generation unit, configured to generate a codebook, where the codebook includes a first sub-codebook and a second sub-codebook, the first sub-codebook includes at least one piece of first feedback information corresponding to the at least one first downlink transmission, the second sub-codebook includes at least one piece of second feedback information corresponding to the at least one second downlink transmission, a location, of the first feedback information corresponding to the first downlink transmission, in the first sub-codebook corresponds to the indication information that is corresponding to the first downlink transmission, and a location, of the second feedback information corresponding to the second downlink transmission, in the second sub-codebook corresponds to the indication information that is corresponding to the second downlink transmission.

According to a tenth aspect of this application, a system is provided, where the system includes:

the network device according to the eighth aspect of this application and the terminal device according to the ninth aspect of this application.

It can be learned from the foregoing technical solutions that, this application has the following beneficial effects:

In the codebook transmission method provided in the embodiments of this application, when sending at least one downlink transmission and indication information corresponding to the at least one downlink transmission, the network device uses a new manner of generating the indication information corresponding to the downlink transmission. For one target downlink transmission in the at least one downlink transmission sent by the network device, the following operations are performed: obtaining an actual occasion corresponding to the target downlink transmission, and obtaining a reference occasion corresponding to the target downlink transmission by offsetting the actual occasion by an occasion offset value; obtaining a frequency domain resource corresponding to the target downlink transmission, where the frequency domain resource is a frequency domain resource carrying the downlink transmission; and defining a pair corresponding to the target downlink transmission, where the pair is a pair between the frequency domain resource corresponding to the target downlink transmission and the reference occasion corresponding to the target downlink transmission. It may be understood that, according to the foregoing manner, a pair corresponding to each of the to-be-sent at least one downlink transmission can be determined. The indication information corresponding to the at least one downlink transmission is then determined based on the obtained pair corresponding to the at least one downlink transmission. It may be understood that, the indication information is determined based on a reference occasion corresponding to a downlink transmission, and indication information corresponding to downlink transmissions at a same reference occasion can be generated in a same time period. Therefore, during preparation of indication information corresponding to one downlink transmission, existence of another downlink transmission may be known, and therefore indication information corresponding to the downlink transmission may be effectively generated.

BRIEF DESCRIPTION OF DRAWINGS

To describe the technical solutions in the embodiments of this application or in the prior art more clearly, the following briefly describes the accompanying drawings required for describing the embodiments or the prior art. Apparently, the accompanying drawings in the following description show some embodiments of this application, and a person of ordinary skill in the art may still derive other drawings from these accompanying drawings without creative efforts.

DESCRIPTION OF EMBODIMENTS

Embodiments of this application provide a codebook transmission method, an apparatus, and a system. The following describes the embodiments of this application with reference to the accompanying drawings in this specification.

In the specification, claims, and accompanying drawings of this application, the terms such as "first", "second" are intended to distinguish between similar objects but do not necessarily indicate a specific order or sequence. It should be understood that the terms used in such a way are interchangeable in proper circumstances, and are merely used to distinguish between objects having a same attribute when the embodiments of this application are described. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

The term "and/or" in the embodiments of this application describes only an association relationship for describing associated objects and indicates that three relationships may exist. For example, A and/or B may indicate the following cases: Only A exists, both A and B exist, and only B exists. In addition, in the descriptions of this application, "a plurality of" means two or more than two. In addition, in the embodiments of this application, "/" may indicate an "and/or" relationship.

Detailed descriptions are provided below.

Figure 1:
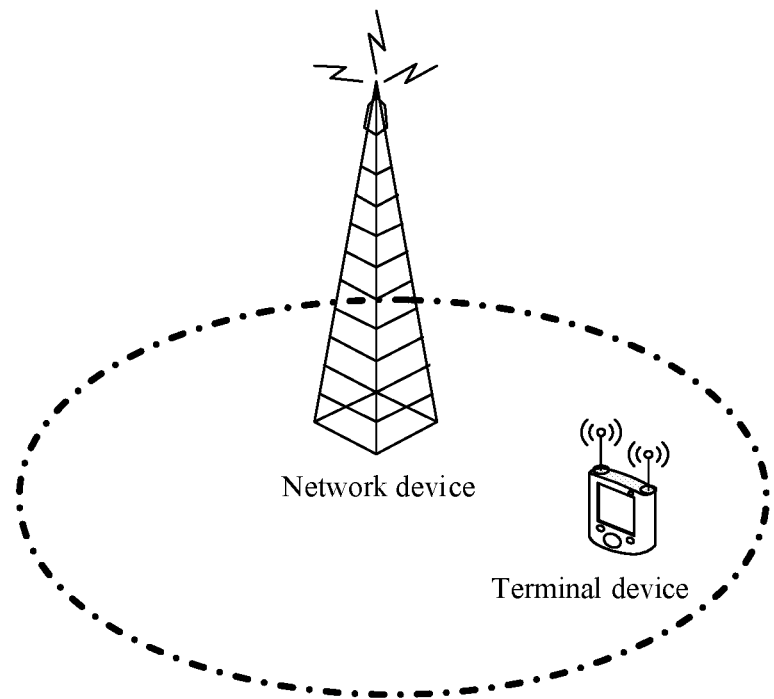
FIG. 1 is a schematic architectural composition diagram of a communications system according to an embodiment of this application.

FIG. 1 is a schematic architectural composition diagram of a communications system according to an embodiment of this application. The communications system provided in this embodiment of this application may include a network device and a terminal device. The network device is a communication resource manager and a communication service provider in a communication process, and may be a base station, or the like. The base station may be a macro base station, a micro base station, a relay station, an access point, and the like in various forms, or may be a device such as a server that provides a communication service. The terminal device is a communication resource consumer in a communication process, and may be a handheld device, a vehicle-mounted device, a wearable device, or a computing device having a wireless communication function, or another processing device connected to a wireless modem, or user equipment (UE), a mobile station (MS), a terminal, terminal equipment, or the like in various forms.

In the communications system shown in FIG. 1, the network device sends, to the terminal device, a downlink transmission and indication information corresponding to the downlink transmission. Before the downlink transmission is sent, a preparation time is required to prepare the indication information. Currently, a C-DAI in the indication information is determined after at least one downlink transmission is sequenced first in ascending order of index of a serving cell that carries the downlink transmission and then in ascending order of actual occasion corresponding to the downlink transmission. Therefore, for downlink transmissions corresponding to a same actual occasion, T-DAIs in indication information are the same. Therefore, during generation of indication information corresponding to one downlink transmission, the other downlink transmission needs to be known. However, if preparation times required for downlink transmissions are different, during preparation of indication information corresponding to one downlink transmission, whether another downlink transmission exists cannot be known, and consequently, indication information corresponding to the one downlink transmission cannot be accurately generated.

The following describe, with reference to the accompanying drawings, technical problems to be resolved in this application by using examples. In the following implementations, that a downlink transmission is a PDSCH is used as an example.

Figure 2:
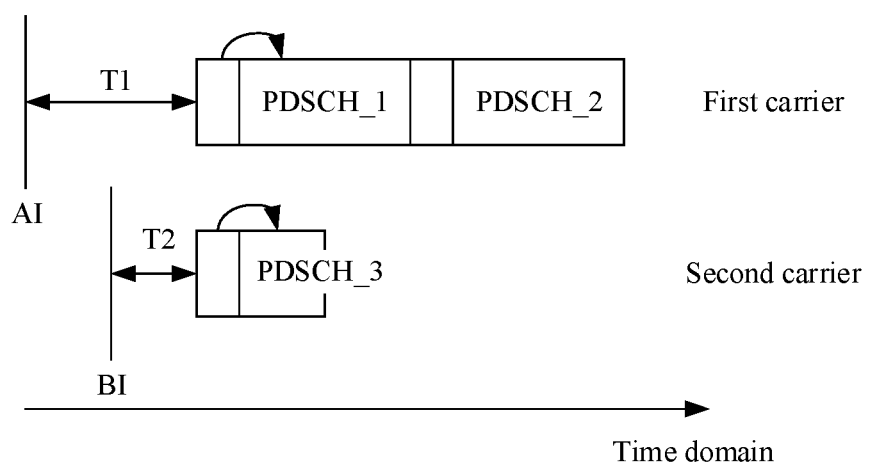
FIG. 2 is a schematic diagram of a prior-art scenario in which indication information is generated.

Implementation 1: As shown in FIG. 2, both a PDSCH_1 and a PDSCH_3 correspond to a same PDCCH monitoring occasion, but belong to different serving cells. The PDSCH_1, a PDSCH_2, and the PDSCH_3 are sequenced first in ascending order of serving cell index and then in ascending order of PDCCH monitoring occasion index. Then it can be determined that indication information corresponding to the PDSCH_1 includes a C-DAI of 1 and a T-DAI of 2, and that indication information corresponding to the PDSCH_3 includes a C-DAI of 2 and a T-DAI of 2. Because T-DAIs corresponding to the PDSCH_1 and the PDSCH_3 are both 2, during preparation of the indication information corresponding to the PDSCH_1, existence of the PDSCH_3 needs to be known. However, as an example shown in FIG. 2, the PDSCH_1 is an enhanced mobile broadband (eMBB) service, and a preparation time T1 required by the PDSCH_1 is longer; while the PDSCH_3 is an ultra-reliable and low latency communication (URLLC) service, and a preparation time T2 required by the PDSCH_3 is shorter. Only when the indication information corresponding to the PDSCH_3 is prepared at a moment B1, existence of the PDSCH_3 can be known. When the indication information corresponding to the PDSCH_1 is prepared at a moment A1, existence of the PDSCH_3 cannot be known, and the indication information corresponding to the PDSCH_1 cannot be accurately generated.

Figure 3:
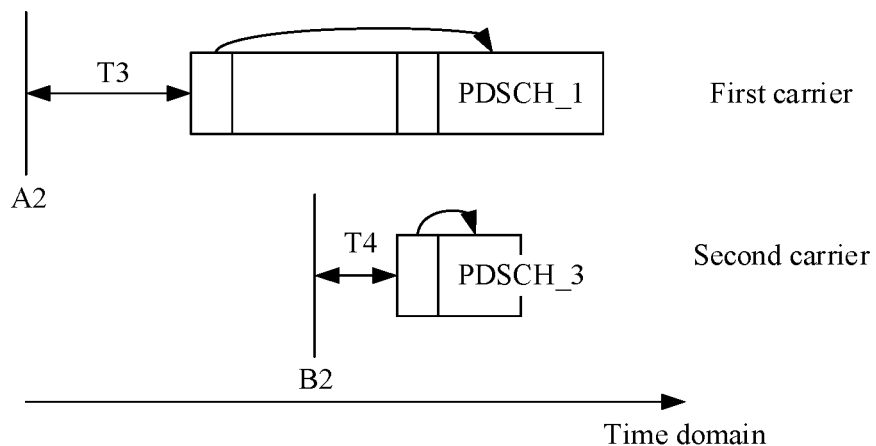
FIG. 3 is a schematic diagram of another prior-art scenario in which indication information is generated.

Implementation 2: As shown in FIG. 3, both a PDSCH_1 and a PDSCH_3 correspond to a same PDSCH occasion, but belong to different serving cells. The PDSCH_1, a PDSCH_2, and the PDSCH_3 are sequenced first in ascending order of serving cell index and then in ascending order of PDSCH occasion index. Then it can be determined that indication information corresponding to the PDSCH_1 includes a C-DAI of 1 and a T-DAI of 2, and that indication information corresponding to the PDSCH_3 includes a C-DAI of 2 and a T-DAI of 2. As shown in FIG. 3, because T-DAIs corresponding to the PDSCH_1 and the PDSCH_3 are both 2, during preparation of the indication information corresponding to the PDSCH_1, existence of the PDSCH_3 needs to be known. Only when the indication information corresponding to the PDSCH_3 is prepared at a moment B2, existence of the PDSCH_3 can be known. When the indication information corresponding to the PDSCH_1 is prepared at a moment A2, existence of the PDSCH_3 cannot be known, and the indication information corresponding to the PDSCH_1 cannot be accurately generated.

Therefore, to resolve the foregoing problem, an information sending method and an information receiving method are provided in the embodiments of this application. The following separately provides descriptions by using examples from a network device side and a terminal device side.

Figure 4:
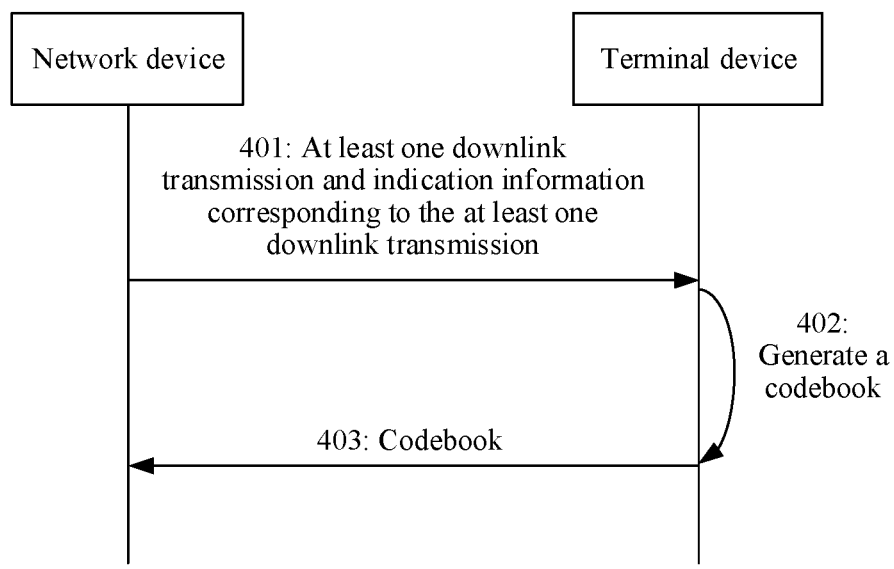
FIG. 4 is a sequence diagram of a codebook transmission method according to an embodiment of this application.

Example Method:

FIG. 4 shows a codebook transmission method according to an embodiment of this application. The method may include the following steps:

401: A network device sends, to a terminal device, at least one downlink transmission and indication information corresponding to the at least one downlink transmission.

In this embodiment of this application, the downlink transmission may be a PDSCH scheduled by using a PDCCH, or the downlink transmission may be a PDCCH used to indicate semi-persistent scheduling (SPS) activation information. In addition, the downlink transmission may be a PDCCH used to indicate SPS release information.

Before sending the at least one downlink transmission to the terminal device, the network device needs to determine the indication information corresponding to the at least one downlink transmission. The indication information includes a C-DAI, or the indication information includes a C-DAI and a T-DAI. In a case, one downlink transmission corresponds to one piece of indication information. In another case, a plurality of downlink transmissions correspond to one piece of indication information. A quantity of downlink transmissions corresponding to one piece of indication information is not specifically limited in this application. The following describes in detail an implementation process of determining indication information corresponding to a target downlink transmission in the at least one downlink transmission. An implementation process of determining indication information corresponding to other downlink transmission in the at least one downlink transmission is similar to the foregoing implementation. Details are not described herein.

In an implementation, during determining of the indication information corresponding to the target downlink transmission, a reference occasion corresponding to the target downlink transmission needs to be determined by using the following steps: An actual occasion corresponding to the target downlink transmission is obtained, where the actual occasion may be a PDCCH monitoring occasion at which DCI that is used to schedule the target downlink transmission is located, or the actual occasion may be the PDCCH monitoring occasion at which DCI that is used to carry the target downlink transmission is located, or the actual occasion may be a PDSCH receiving occasion at which the target downlink transmission is located. The actual occasion corresponding to the target downlink transmission is offset by a preconfigured occasion offset value, and the reference occasion corresponding to the target downlink transmission is obtained. In an implementation, the occasion offset value is not equal to 0. It may be understood that when the occasion offset value is not equal to 0, that is, the reference occasion is not equal to the actual occasion, the reference occasion may be used to determine the indication information, to resolve a problem that the network device cannot obtain and prepare the indication information due to different preparation times of the indication information. When the occasion offset value is equal to 0, the reference occasion is equal to the actual occasion. Specifically, in a possible implementation, for a specific target frequency domain resource (for example, a primary serving cell), an occasion offset value corresponding to the target frequency domain resource is predefined as 0. In another possible implementation, for a specific time domain resource length (for example, 2 symbols), an occasion offset value corresponding to the time domain resource length is predefined as 0. It may be understood that, for another target frequency domain resource or another time domain resource length, an actual occasion is adjusted by using the target frequency domain resource (a primary serving cell) or the target time domain resource length (2 symbols) as a reference, to obtain the reference occasion corresponding to the downlink transmission. It should be noted that the specific target frequency domain resource and/or the specific time domain resource length may be configured via RRC signaling or may be predefined for the terminal device.

In addition, during determining of the indication information corresponding to the target downlink transmission, a target frequency domain resource corresponding to the target downlink transmission needs to be obtained, where the target frequency domain resource is a frequency domain resource on which the target downlink transmission is located. The frequency domain resource may be a serving cell, a carrier, or a C-BWP. The network device configures at least two candidate frequency domain resources for the terminal device via higher layer signaling, where the target frequency domain resource corresponding to the target downlink transmission is a frequency domain resource in the at least two candidate frequency domain resources. After the reference occasion corresponding to the target downlink transmission and the target frequency domain resource corresponding to the target downlink transmission are obtained, a pair corresponding to the target downlink transmission is defined, where the pair is a pair of the reference occasion corresponding to the target downlink transmission and the target frequency domain resource.

According to the foregoing implementation of obtaining the pair corresponding to the target downlink transmission, a pair corresponding to the at least one downlink transmission sent by the network device is obtained. Then, pairs corresponding to the at least one downlink transmission are counted based on a reference occasion and a target frequency domain resource in the pair corresponding to the at least one downlink transmission. The indication information corresponding to the at least one downlink transmission is determined based on an obtained quantity of pairs corresponding to the at least one downlink transmission.

In an implementation, during determining of a respective value of the C-DAI corresponding to the at least one downlink transmission, the pair corresponding to the at least one downlink transmission is sequenced in a first preset order, and an accumulative quantity of pairs up to a current pair is the value of the C-DAI. The current pair is a pair of a current reference occasion and a current frequency domain resource. The current pair is a pair corresponding to a current target downlink transmission in the at least one downlink transmission, to be specific, a target frequency domain resource on which the current target downlink transmission is located is the current target frequency domain resource, and a reference occasion corresponding to the current target downlink transmission is the current reference occasion. It may be understood that during counting of a C-DAI corresponding to one downlink transmission, the one downlink transmission is the current downlink transmission. Therefore, a pair corresponding to the downlink transmission is the current pair, a frequency domain resource on which the downlink transmission is located is the current target frequency domain resource, and a reference occasion corresponding to the downlink transmission is the current reference occasion. The first preset order indicates that the pair is sequenced first in ascending order of target frequency domain resource index, and then in ascending order of reference occasion index. The ascending order of target frequency domain resource indexes is an order of target frequency domain resource indexes from small to large. The ascending order of reference occasion indexes is an order of reference occasion indexes from small to large, or an order of reference occasions from early to late.

In an implementation, the indication information corresponding to the target downlink transmission in the at least one target downlink transmission may be determined in the following manner: The pair is a current pair, and a value of a C-DAI corresponding to the target downlink transmission is an accumulative quantity of pairs up to the current pair, and the current pair is a pair of a current reference occasion and a current target frequency domain resource. The accumulative quantity of pairs is an accumulative quantity of pairs corresponding to the at least one downlink transmission that are sequenced in the first preset order, and the first preset order indicates that the pair is sequenced first in ascending order of frequency domain resource index and then in ascending order of reference occasion index. It may be understood that, the C-DAI corresponding to the target downlink transmission is the accumulative quantity of pairs up to the current pair that are sequenced in the first preset order, where the pair corresponding to target downlink transmission is used as the current pair. It may be understood that an implementation of determining a C-DAI corresponding to another downlink transmission in the at least one downlink transmission is similar to the implementation of determining the C-DAI corresponding to the target downlink transmission described in the foregoing. Details are not described herein again.

In another implementation, during determining of a respective value of a T-DAI corresponding to the at least one downlink transmission, a total quantity of pairs corresponding to the at least one downlink transmission is updated based on a second preset order, and a total quantity of pairs up to the current reference occasion is the value of the T-DAI. The second preset order is an ascending order of reference occasion index. The ascending order of reference occasion indexes is an order of reference occasion indexes from small to large, or an order of reference occasions from early to late. The reference occasion corresponding to the current target downlink transmission in the at least one piece of downlink transmission is the current reference occasion. It may be understood that during counting of a T-DAI corresponding to one downlink transmission, the one downlink transmission is the current downlink transmission, and a reference occasion corresponding to the downlink transmission is the current reference occasion.

In an implementation, the indication information corresponding to the target downlink transmission in the at least one target downlink transmission may be determined in the following manner: A value of a T-DAI corresponding to the target downlink transmission is a total quantity of pairs up to a current reference occasion, the total quantity of pairs is a value obtained after a total quantity of pairs corresponding to the target downlink transmission is updated based on the second preset order, and the second preset order is an ascending order of reference occasion index. It may be understood that, the T-DAI corresponding to the target downlink transmission is the total quantity of pairs up to the current reference occasion that are sequenced in the second preset order, where the pair corresponding to target downlink transmission is used as a current pair, and a reference occasion in the pair is a current reference occasion. It may be understood that an implementation of determining a T-DAI corresponding to another downlink transmission in the at least one downlink transmission is similar to the implementation of determining the T-DAI corresponding to the target downlink transmission described in the foregoing. Details are not described herein again.

To better describe the implementation of determining the indication information corresponding to the at least one downlink transmission, the following uses an example for description, to facilitate understanding.

Figure 5A:
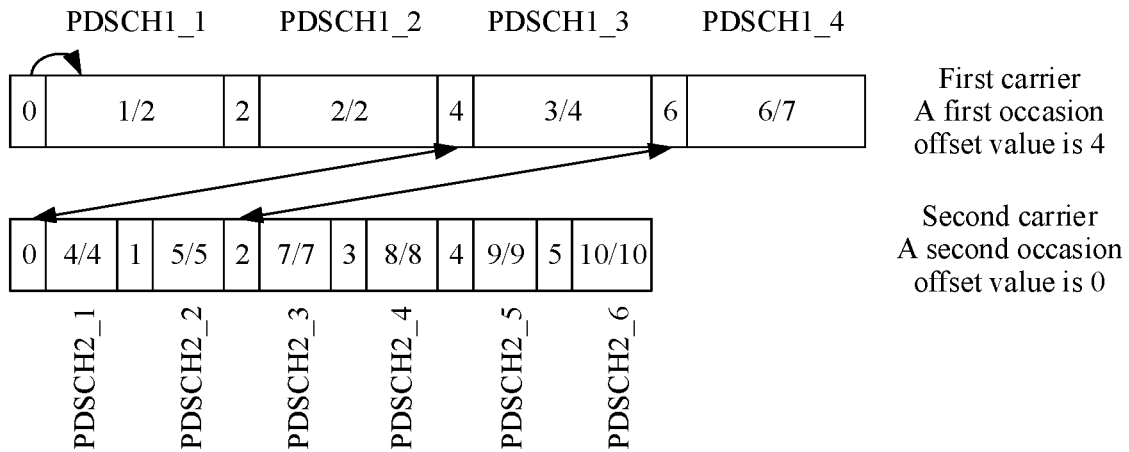
FIG. 5a and FIG. 5b are a schematic diagram of indication information determining according to an embodiment of this application.

As shown in FIG. 5a, the at least one downlink transmission includes a downlink transmission 1_1, a downlink transmission 1_2, a downlink transmission 1_3, a downlink transmission 1_4, a downlink transmission 2_1, a downlink transmission 2_2, a downlink transmission 2_3, a downlink transmission 2_4, a downlink transmission 2_5, and a downlink transmission 2_6. The downlink transmission 1_1, the downlink transmission 1_2, the downlink transmission 1_3, and the downlink transmission 1_4 are carried on a first frequency domain resource CC 1. The downlink transmission 2_1, the downlink transmission 2_2, the downlink transmission 2_3, the downlink transmission 2_4, the downlink transmission 2_5, and the downlink transmission 2_6 are carried on a second frequency domain resource CC 2. That a first occasion offset value configured for the first frequency domain resource CC 1 is 4 and a second occasion offset value configured for the second frequency domain resource CC2 is 0 is used as an example for description.

The following can be learned from FIG. 5a: An actual occasion corresponding to the downlink transmission 1_1 is an occasion 0; after the actual occasion corresponding to the downlink transmission 1_1 is offset by the first occasion offset value, a corresponding reference occasion is an occasion −4; a frequency domain resource is the CC 1; and a pair corresponding to the downlink transmission 1_1 is defined as {−4, CC 1}. An actual occasion corresponding to the downlink transmission 1_2 is an occasion 2; a corresponding reference occasion obtained after the actual occasion corresponding to the downlink transmission 1_2 is offset by the first occasion offset value is an occasion −2; a frequency domain resource is the CC 1; and a pair corresponding to the downlink transmission 1_2 is defined as {−2, CC 1}. An actual occasion corresponding to the downlink transmission 1_3 is an occasion 4; a corresponding reference occasion obtained after the actual occasion corresponding to the downlink transmission 1_3 is offset by the first occasion offset value is an occasion 0; a frequency domain resource is the CC 1; and a pair corresponding to the downlink transmission 1_3 is defined as {0, CC 1}. An actual occasion corresponding to the downlink transmission 1_4 is an occasion 6; a corresponding reference occasion obtained after the actual occasion corresponding to the downlink transmission 1_4 is offset by the first occasion offset value is an occasion 2; a frequency domain resource is the CC 1; and a pair corresponding to the downlink transmission 1_4 is defined as {2, CC 1}.

Similarly, an actual occasion corresponding to the downlink transmission 2_1 is an occasion 0; a corresponding reference occasion obtained after the actual occasion corresponding to the downlink transmission 2_1 is offset by the second occasion offset value is the occasion 0; a frequency domain resource is the CC 2; and a pair corresponding to the downlink transmission 2_1 is defined as {0, CC 2}. An actual occasion corresponding to the downlink transmission 2_2 is an occasion 1; a corresponding reference occasion obtained after the actual occasion corresponding to the downlink transmission 2_2 is offset by the second occasion offset value is the occasion 1; a frequency domain resource is the CC 2; and a pair corresponding to the downlink transmission 2_2 is defined as {1, CC 2}. An actual occasion corresponding to the downlink transmission 2_3 is an occasion 2; a corresponding reference occasion obtained after the actual occasion corresponding to the downlink transmission 2_3 is offset by the second occasion offset value is the occasion 2; a frequency domain resource is the CC 2; and a pair corresponding to the downlink transmission 2_3 is defined as {2, CC 2}. An actual occasion corresponding to the downlink transmission 2_4 is an occasion 3; a corresponding reference occasion obtained after the actual occasion corresponding to the downlink transmission 2_4 is offset by the second occasion offset value is the occasion 3; a frequency domain resource is the CC 2; and a pair corresponding to the downlink transmission 2_4 is defined as {3, CC 2}. An actual occasion corresponding to the downlink transmission 2_5 is an occasion 4; a corresponding reference occasion obtained after the actual occasion corresponding to the downlink transmission 2_5 is offset by the second occasion offset value is the occasion 4; a frequency domain resource is the CC 2; and a pair corresponding to the downlink transmission 2_5 is defined as {4, CC 2}. An actual occasion corresponding to the downlink transmission 2_6 is an occasion 5; a corresponding reference occasion obtained after the actual occasion corresponding to the downlink transmission 2_6 is offset by the second occasion offset value is the occasion 5; a frequency domain resource is the CC 2; and a pair corresponding to the downlink transmission 2_6 is defined as {5, CC 2}.

During determining of a C-DAI corresponding to the at least one downlink transmission, pairs corresponding to the at least one downlink transmission is sequenced in the first preset order as follows: a downlink transmission 1_1 {−4, CC 1}, a downlink transmission 1_2 {−2, CC 1}, a downlink transmission 1_3 {0, CC 1}, a downlink transmission 2_1 {0, CC 2}, a downlink transmission 2_2 {1, CC 2}, a downlink transmission 1_4 {2, CC 1}, a downlink transmission 2_3 {2, CC 2}, a downlink transmission 2_4 {3, CC 2}, a downlink transmission 2_5 {4, CC 2}, and a downlink transmission 2_6 {4, CC 2}.

Therefore, a C-DAI corresponding to the downlink transmission 1_1 is an accumulative quantity 1 of pairs up to the downlink transmission 1_1 {−4, CC 1}; a C-DAI corresponding to the downlink transmission 1_2 is an accumulative quantity 2 of pairs up to the downlink transmission 1_2 {−2, CC 1}; a C-DAI corresponding to the downlink transmission 1_3 is an accumulative quantity 3 of pairs up to downlink transmission 1_3 {0, CC 1}; a C-DAI corresponding to the downlink transmission 2_1 is an accumulative quantity 4 of pairs up to the downlink transmission 2_1 {0, CC 2}; a C-DAI corresponding to the downlink transmission 2_2 is an accumulative quantity 5 of pairs up to the downlink transmission 2_2 {1, CC 2}; a C-DAI corresponding to the downlink transmission 1_4 is an accumulative quantity 6 of pairs up to the downlink transmission 1_4 {2, CC 1}; a C-DAI corresponding to the downlink transmission 2_3 is an accumulative quantity 7 of pairs up to the downlink transmission 2_3 {2, CC 2}; a C-DAI corresponding to the downlink transmission 2_4 is an accumulative quantity 8 of pairs up to the downlink transmission 2_4 {3, CC 2}; a C-DAI corresponding to the downlink transmission 2_5 is an accumulative quantity 9 of pairs up to the downlink transmission 2_5 {4, CC 2}; and a C-DAI corresponding to the downlink transmission 2_6 is an accumulative quantity 10 of pairs up to the downlink transmission 2_6 {5, CC 2}.

During determining of a T-DAI corresponding to the at least one downlink transmission, pairs corresponding to the at least one downlink transmission is sequenced in the second preset order as follows: the downlink transmission 1_1 {−4, CC 1}, the downlink transmission 1_2 {−2, CC 1}, the downlink transmission 1_3 {0, CC 1} and the downlink transmission 2_1 {0, CC 2}, the downlink transmission 2_2 {1, CC 2}, the downlink transmission 1_4 {2, CC 1} and the downlink transmission 2_3 {2, CC 2}, the downlink transmission 2_4 {3, CC 2}, and the downlink transmission 2_5 {4, CC 2} and the downlink transmission 2_6 {4, CC 2}.

Therefore, the following can be obtained: A T-DAI corresponding to the downlink transmission 1_1 is a total quantity 1 of pairs up to the occasion −4 (namely, the reference occasion corresponding to the downlink transmission 1_1). A T-DAI corresponding to the downlink transmission 1_2 is a total quantity 2 of pairs up to the occasion 2. Reference occasions corresponding to the downlink transmission 1_3 and the downlink transmission 2_1 are both the occasion 0, and therefore T-DAIs corresponding to the downlink transmission 1_3 and the downlink transmission 2_1 are both a total quantity 4 of pairs up to the occasion 0. A T-DAI corresponding to the downlink transmission 2_2 is a total quantity 5 of pairs up to the occasion 1. Reference occasions corresponding to the downlink transmission 1_4 and the downlink transmission 2_3 are both the occasion 2, and therefore T-DAIs corresponding to the downlink transmission 1_4 and the downlink transmission 2_3 are both a total quantity 7 of pairs up to the occasion 2. A T-DAI corresponding to the downlink transmission 2_4 is a total quantity 8 of pairs up to the occasion 3. A T-DAI corresponding to the downlink transmission 2_5 is a total quantity 9 of pairs up to the occasion 4. A T-DAI corresponding to the downlink transmission 2_6 is a total quantity 10 of pairs up to the occasion 6.

Therefore, in conclusion, in the implementation shown in FIG. 5a, the indication information is presented with the C-DAI and the T-DAI in sequence. For example, indication information corresponding to the downlink transmission 1_1 is 1/1, indication information corresponding to the downlink transmission 1_2 is 2/2, indication information corresponding to the downlink transmission 1_3 is 3/4, indication information corresponding to the downlink transmission 2_1 is 4/4, indication information corresponding to the downlink transmission 2_2 is 5/5, indication information corresponding to the downlink transmission 1_4 is 6/7, indication information corresponding to the downlink transmission 2_3 is 7/7, indication information corresponding to the downlink transmission 2_4 is 8/8, indication information corresponding to the downlink transmission 2_5 is 9/9, and indication information corresponding to the downlink transmission 2_6 is 10/10.

It should be noted herein that the foregoing implementations are merely intended to better describe a manner of generating indication information provided in this application. During specific implementation, a quantity of downlink transmissions, a quantity of frequency domain resources, a quantity of downlink transmissions carried on one frequency domain resource, an occasion offset value configured for the frequency domain resource, and the like may be specifically set based on an actual requirement, and are not limited to the descriptions in the foregoing implementations.

It may be understood that the configured time offset value is related to a time difference, where the time difference is a time difference between determining indication information corresponding to a downlink transmission and sending the downlink transmission. After an actual occasion corresponding to the downlink transmission is offset by the time offset value, a reference occasion corresponding to the downlink transmission is obtained. A problem that the indication information cannot be accurately generated due to different time differences can be resolved by generating the indication information by using the reference occasion. It may be further understood that T-DAIs corresponding to downlink transmissions at a same reference occasion are the same, and C-DAIs corresponding to downlink transmissions on different target frequency domain resources at a same reference occasion are different. After the actual occasion corresponding to the downlink transmission is offset by the occasion offset value, indication information corresponding to downlink transmissions at a same reference occasion can be generated in a same time period, and downlink transmissions at a same reference occasion is classified into one group. To be specific, for different downlink transmissions at a same reference occasion, when indication information corresponding to one downlink transmission is determined, existence of another downlink transmission at a same reference occasion may be further known. Therefore, it can be ensured that, at the reference occasion, a total quantity of pairs represented by the T-DAI is accurate, and an accumulative quantity of pairs represented by the C-DAI is accurate, so that the indication information corresponding to the downlink transmission can be effectively generated.

In an implementation, the network device may configure an occasion offset value for the terminal device via higher layer signaling. In other words, the network device sends one piece of higher layer signaling to the terminal device, where the higher layer signaling includes the occasion offset value configured by the network device for the terminal device.

In another implementation, the network device may further configure the occasion offset value for the network device via DCI. In other words, the network device sends a PDCCH to the terminal device, and DCI on the PDCCH includes the occasion offset value configured by the network device for the terminal device.

The network device determines a reference occasion based on the configured occasion offset value and an actual occasion. The network device determines indication information based on a pair of the reference occasion and a target frequency domain resource. Specific values of a C-DAI and a T-DAI are described in the foregoing, and details are not described again. It should be understood that, when the actual occasion is a PDSCH reception occasion, the network device should send a downlink transmission at the actual occasion. When the actual occasion is a PDCCH monitoring occasion, the network device should send, at the actual occasion, DCI information corresponding to the downlink transmission. The reference occasion is used to count a C-DAI corresponding to the downlink transmission, or count a C-DAI and a T-DAI corresponding to the downlink transmission.

After determining the indication information corresponding to the at least one downlink transmission, the network device sends the at least one downlink transmission and the indication information corresponding to the at least one downlink transmission to the terminal device. After receiving the at least one downlink transmission and the indication information corresponding to the at least one downlink transmission, the terminal device needs to feed back a codebook to the network device. The codebook is used to feed back a decoding result of the PDSCH scheduled by the PDCCH. When the PDSCH is successfully decoded, the terminal device feeds back an acknowledgment (ACK) via the codebook; when the PDSCH fails to be decoded or no PDSCH sent by the base station is received, the terminal device feeds back a negative acknowledgment (NACK) via the codebook. Alternatively, the codebook is used to feedback whether the PDCCH used to indicate SPS activation is received. When the PDCCH used to indicate SPS activation is received, an ACK is fed back via the codebook. When the PDCCH used to indicate SPS activation is not received, a NACK is fed back via the codebook. Alternatively, the codebook is used to feedback whether the PDCCH used to indicate SPS release is received. When the PDCCH used to indicate SPS release is received, an ACK is fed back via the codebook. When the PDCCH used to indicate SPS release is not received, a NACK is fed back via the codebook.

The following describes in detail a process in which the terminal device generates and feeds back a codebook to the network device.

402: The terminal device receives the at least one downlink transmission and the indication information corresponding to the at least one downlink transmission sent by the network device, and generates a codebook, where the codebook includes at least one piece of feedback information corresponding to the at least one downlink transmission, the at least one downlink transmission includes a target downlink transmission, and a location, of feedback information corresponding to the target downlink transmission, in the codebook, corresponds to indication information corresponding to the target downlink transmission.

In 5G NR, the network device configures a plurality of serving cells for the terminal device via radio resource control (RRC) signaling. The plurality of serving cells may provide a service in a frequency division duplexing (FDD) mode, or a time division duplexing (TDD) mode. The network device may further pre-configure one or more search spaces for the terminal device via the RRC signaling or media access control (MAC) signaling. In a scenario, search spaces configured by the network device for the terminal device exist in a plurality of serving cells configured by the network device for the terminal device. In this case, the terminal device can detect a PDCCH in the search spaces in the plurality of serving cells configured by the network device. In another scenario, only some of the plurality of serving cells configured by the network device for the terminal have search spaces, and the network device can detect the PDCCH only in the search spaces in some of the plurality of serving cells configured by the network device.

The PDCCH detected by the terminal device carries DCI. DCI corresponding to one PDSCH may include a feedback time corresponding to the PDSCH. The feedback time is a time from scheduling the PDSCH to feeding back feedback information corresponding to the PDSCH. The DCI may further include indication information corresponding to a physical uplink control channel (PUCCH) used during feedback. The terminal device receives, based on the foregoing information and other information (for example, time domain resource information, frequency domain resource information, and a used modulation and coding scheme corresponding to the PDSCH) in the DCI, the PDSCH scheduled by the PDCCH. One piece of DCI may schedule one PDSCH, or may schedule a plurality of PDSCHs.

A maximum feedback time and a minimum feedback time are determined based on the configured higher layer signaling. After the PDSCH scheduled by the PDCCH, the PDCCH used to indicate SPS activation, or the PDCCH used to indicate SPS release is received, an actual occasion set is determined based on information such as a value of a feedback time between the minimum feedback time and the maximum feedback time corresponding to the PDSCH. In the actual occasion set, feedback information corresponding to downlink transmissions on all actual occasions is carried on a same PUCCH. Actual occasions in the actual occasion set are sequenced and numbered in ascending order of start time of search space corresponding to the occasions in the configured serving cells. A serving cell set is a set of serving cells configured for the terminal device.

The DCI includes the indication information corresponding to the at least one downlink transmission, that is, includes a C-DAI, or includes a C-DAI and a T-DAI. Generally, to save bits in the DCI, the C-DAI and the T-DAI in the DCI each occupy two bits. In the DCI, four states {00, 01, 10, 11} indicate that values of each of the C-DAI and the T-DAI may be {1, 2, 3, 4}. In addition, if a value is greater than 4, loop counting may be used, that is, {1, 2, 3, 4, 5(1), 6(2), 7(3) . . . }. Specifically, a formula mod(Y−1,4)+1=1 may be used, where Y is an actual value of the C-DAI or the T-DAI. For example, when an actual value of the C-DAI or the T-DAI is 1 to 7, loop counting may be used, that is, {1, 2, 3, 4, 1, 2, 3}.

After determining the actual occasion set, the terminal device determines, based on the indication information in the DCI, a codebook that needs to be fed back. The feedback information corresponding to the downlink transmission and a location, of the feedback information corresponding to the downlink transmission, in the codebook need to be determined for determining the codebook.

During determining of the feedback information corresponding to the downlink transmission, according to step 401, the C-DAI in the DCI is used to indicate an accumulative quantity of pairs up to a pair of a current serving cell and a current reference occasion, and the T-DAI is used to indicate a total quantity of pairs up to the current reference occasion. An occasion in this application may be the PDCCH monitoring occasion, or may be the PDSCH reception occasion.

Whether another downlink transmission is lost can be determined based on the indication information, in the DCI, corresponding to the received downlink transmission. When it is determined that a downlink transmission is not received, feedback information corresponding to the downlink transmission is a NACK. It may be understood that, when the PDCCH or the PDSCH included the downlink transmission is not received, the terminal device cannot determine whether the PDCCH used to indicate SPS activation or release is lost or whether the PDSCH is lost. However, the terminal device may determine, via another received C-DAI and T-DAI, whether a downlink transmission that is not received is lost. When determining that a downlink transmission is lost, the terminal device feeds back a NACK via feedback information corresponding to the lost downlink transmission.

In a scenario in which a downlink transmission includes the PDSCH invoked by the PDCCH, for a received PDSCH, feedback information is determined based on whether the PDSCH can be correctly decoded. Specifically, when the PDSCH is correctly decoded, the feedback information is an ACK; or when the PDSCH is not correctly decoded, the feedback information is a NACK.

When a downlink transmission includes the PDCCH used to indicate SPS activation or release, when the PDCCH is received, feedback information corresponding to the PDCCH is an ACK; or when the PDCCH is not received, feedback information corresponding to the PDCCH is a NACK.

In an implementation, in the codebook, "1" may be used to represent an ACK, and "0" may be used to represent a NACK.

Figure 6:
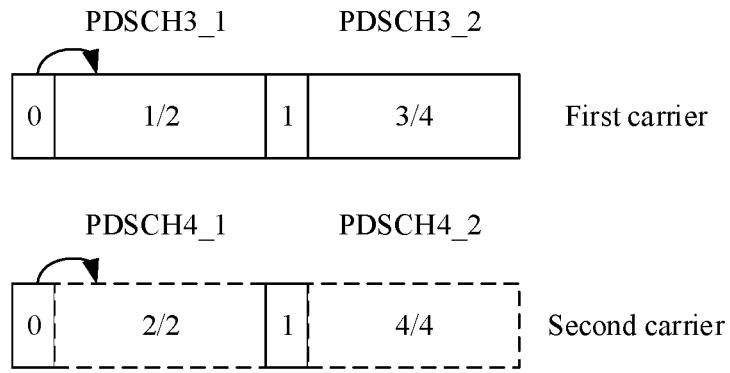
FIG. 6 is a schematic diagram of feedback information determining according to an embodiment of this application.

For example, as shown in FIG. 6, the terminal device receives, at an occasion 0, DCI corresponding to a PDSCH_3_1, where C-DAI/T-DAI included in the DCI is 1/2, indicating that there are two scheduled downlink transmissions up to the occasion 0. However, the terminal device receives only the PDSCH 3_1, indicating that up to the occasion 0, the other scheduled downlink transmission (namely, a PDSCH 4_1 that is actually scheduled) is not received, and C-DAI/T-DAI corresponding to the lost downlink transmission should be 2/2. The terminal device receives, at an occasion 1, DCI corresponding to a PDSCH 3_2, where C-DAI/T-DAI corresponding to the PDSCH 3_2 is 3/4, indicating that there are four scheduled downlink transmissions up to the occasion 1. Because there are two downlink transmissions up to the previous occasion 0, there should be two scheduled downlink transmissions at the occasion 1. However, the terminal device receives only the PDSCH 3_2, and therefore it is determined that C-DAI/T-DAI corresponding to an unreceived downlink transmission (namely, a PDSCH 4_2 that is actually scheduled) should be 4/4. If the PDSCH 3_1 is correctly decoded and the PDSCH 3_2 is not correctly decoded, feedback information corresponding to the PDSCH 3_1 is an ACK, and feedback information corresponding to the PDSCH 3_2 is a NACK. Feedback information corresponding to the PDSCH 4_1 is a NACK, and feedback information corresponding to the PDSCH 4_2 is a NACK.

After the feedback information corresponding to the downlink transmission is determined in the foregoing manner, the location, of the feedback information corresponding to the downlink transmission, in the codebook needs to be determined. The location, of the feedback information corresponding to the downlink transmission, in the codebook corresponds to the indication information corresponding to the downlink information. It may be understood that, according to the method for generating indication information in 401, it can be learned that a C-DAI in the indication information is an accumulative quantity of pairs up to a current pair, where a pair corresponding to the at least one downlink transmission is sequenced in the first preset order. A T-DAI in the indication information is a total quantity of pairs up to a current reference occasion, and the total quantity of pairs is obtained after a total quantity of pairs corresponding to the at least one downlink transmission is updated based on the second preset order. Therefore, a sequence location of a pair corresponding to the downlink transmission can be determined based on the C-DAI in the indication information corresponding to the at least one downlink transmission, and the location, of the feedback information corresponding to the downlink transmission, in the codebook is determined based on the sequence location of the pair corresponding to the downlink transmission. In other words, a sequence location, of the feedback information corresponding to the at least one downlink transmission, in the codebook is consistent with the sequence location of the pair corresponding to the at least one downlink transmission.

For example, still as shown in FIG. 6, it is determined, based on the indication information, that a sequence of pairs corresponding to the downlink transmissions is the PDSCH 3_1, the PDSCH 4_1, the PDSCH 3_2, and PDSCH 4_2, and a fed-back codebook indicates an ACK, a NACK, a NACK, and an ACK. When "0" and "1" are used for expression, the fed-back codebook is "1001".

In an implementation, there are several possible implementations in the following in which the terminal device generates a codebook:

In the first implementation, the terminal device generates a codebook based on the received indication information corresponding to the at least one downlink transmission.

It may be understood that, in this application, feedback information corresponding to one downlink transmission is a NACK or an ACK. Specifically, one NACK or ACK may be fed back, or a plurality of NACKs or ACKs may be fed back. A quantity of NACKs or ACKs is not limited in this application. It may be understood that when the network device includes one transport block in one downlink transmission, the terminal device feeds back one NACK or ACK via feedback information corresponding to the downlink transmission. If the transport block is correctly decoded, an ACK is fed back; if the transport block is not correctly decoded, a NACK is fed back. When the network device includes two transport blocks in one downlink transmission, the terminal device may feed back two pieces of feedback information corresponding to the downlink transmission, where each piece of feedback information corresponds to one transport block. Alternatively, the terminal device may feed back one piece of feedback information, for example, if both of the two transport blocks are correctly decoded, the terminal device feeds back an ACK; if neither of the two transport blocks is correctly decoded, the terminal device feeds back a NACK. When the network device configures a code block group in one downlink transmission, the terminal device determines a quantity of pieces of feedback information based on a quantity of code block groups, where each piece of feedback information corresponds to one code block group.

To be specific, the terminal device receives the indication information corresponding to the at least one downlink transmission sent by the network device, and determines a received downlink transmission and an unreceived downlink transmission based on the indication information corresponding to the downlink transmission. The terminal device determines that feedback information corresponding to the unreceived downlink transmission is a NACK; and the terminal device determines that in the received downlink transmission, feedback information corresponding to a correctly decoded downlink transmission is an ACK, and feedback information corresponding to an incorrectly decoded downlink transmission is a NACK. The terminal device determines, based on the indication information corresponding to the at least one downlink transmission, a location, of the feedback information corresponding to the downlink transmission, in the codebook. The indication information corresponding to the downlink transmission is sent by the network device to the terminal device.

Specifically, the terminal device determines a reference occasion based on the received occasion offset value configured by the network device, and generates a codebook based on the reference occasion and the received indication information corresponding to the at least one downlink transmission.

Optionally, the terminal device may receive the occasion offset value configured by the network device via higher layer signaling (RRC signaling or MAC signaling).

Optionally, the terminal device may receive the occasion offset value configured by the network device via the DCI.

Optionally, the occasion offset value may be predefined for a target frequency domain resource, or predefined for an actual occasion.

Specifically, a codebook may be generated via the following pseudo-code:

Step 1: Set c=0, where c is a target frequency domain resource index and a lower index corresponds to a lower RRC index of the target frequency domain resource.

Step 2: Set m'=0, where m' is an actual occasion index, and a lower index corresponds to an earlier occasion.

Step 3: Set m=0, where m is a reference occasion index, and a lower index corresponds to a lower calculated reference occasion index.

The following are possibilities of calculating the reference occasion index:

Possibility 1: m=m'−occasion offset value; Possibility 2: m=m'+occasion offset value; Possibility 3: m=(m'−occasion offset value) mod M, where M is a quantity of all actual occasions or a quantity of all possible actual occasions;

Possibility 4: m=(m'−occasion offset value) mod M, where M is a quantity of all actual occasions or a quantity of all possible actual occasions;

Possibility 5: m=(m'−occasion offset value) mod K, where K is a quantity of all reference occasions or a quantity of all possible reference occasions;

Possibility 6: m=(m'−occasion offset value) mod K, where K is a quantity of all reference occasions or a quantity of all possible reference occasions;

Step 4: Set $N^{DL}$ as a quantity of candidate frequency domain resources configured by a higher layer for the terminal device.

Step 5:
Possibility 1:
  While m<M
    While c<$N^{DL}$
      Determine, based on a C-DAI or based on a C-DAI and a T-DAI, a quantity of bits corresponding to a pair of a corresponding reference occasion and a target frequency domain resource, and corresponding locations of the bits in a codebook
      c=c+1;
    end while
  m=m+1
  end while
Possibility 2:
  While m<K
    While c<$N^{DL}$
      Determine, based on a C-DAI or based on a C-DAI and a T-DAI, a quantity of bits corresponding to a pair of a corresponding reference occasion and a target frequency domain resource, and corresponding locations of the bits in a codebook
c=c+1;
end while
m=m+1
end while For example, obtained reference occasions are {−4, −2, 0, 1, 2, 3, 4, 5}.

Optionally, for the possibility 1 and the possibility 2, an occasion interval in which the reference occasion is located is directly used as a reference occasion set to determine the codebook. For example, −4≤reference occasion index m<M0, where M0=5.

Optionally, to facilitate calculation of the foregoing pseudo-code parameter, a sequencing method in which a lowest reference occasion index in a sequence of reference occasion indexes is defined as 0 may be used.

For the possibility 5 and the possibility 6, in a specific implementation 1, assuming that the lowest reference occasion index is Q, N=−Q. Therefore, N is added to the calculated reference occasion index to obtain a first occasion index set. Specifically, assuming that Q=4, N=−4. Therefore, the reference occasion set is changed from {−4, −2, 0, 1, 2, 3, 4, 5} to {0, 2, 4, 5, 6, 7, 8, 9}. Optionally, 0≤occasion index number m<K, where K=10.

For the possibility 5 and the possibility 6, in a specific implementation 2, assuming that a lowest PDCCH monitoring occasion index is Q, the lowest PDCCH monitoring occasion index is changed to 0, and subsequent elements are increased by 1 in sequence, to obtain an updated reference occasion set. Specifically, the reference occasion set is changed from {−4, −2, 0, 1, 2, 3, 4, 5} to {0, 1, 2, 3, 4, 5, 6, 7}. Optionally, 0≤reference occasion m<K, where K=8.

In the second implementation, the terminal device generates a codebook based on a pair of an actual occasion and a target frequency domain resource.

After determining a received downlink transmission and an unreceived downlink transmission based on the indication information corresponding to the at least one downlink transmission sent by the network device, the terminal device generates a codebook based on a pair of an actual occasion and a target frequency domain resource.

Specifically, an actual pair corresponding to each downlink transmission is sequenced based on the actual occasion and the target frequency domain resource corresponding to the at least one downlink transmission. Feedback information corresponding to the at least one downlink transmission is sequenced in the codebook based on a sequence of an actual pair corresponding to the at least one downlink transmission. A sequencing order may indicate that sequencing is performed first in ascending order of target frequency domain resource index, and then in ascending order of actual occasion index. The ascending order of target frequency domain resource indexes is an order of target frequency domain resource indexes from small to large. The ascending order of actual occasion indexes is an order of actual occasion indexes from small to large, or an order of actual occasions from early to late.

The terminal device generates a codebook. In the codebook, the location of the feedback information corresponding to the downlink transmission corresponds to the actual occasion and the target frequency domain resource that are corresponding to the downlink transmission. A manner of generating a codebook based on the actual occasion and the target frequency domain resource has been described above. For details, refer to the foregoing descriptions. Details are not described herein again.

In an implementation, after generating the codebook, the terminal device performs channel coding based on the codebook. A type of the channel coding may be any one or more of polar coding, low-density parity-check (LDPC) coding, linear concatenated coding, linear block coding, convolutional coding, or turbo coding. If linear concatenated coding is used, cyclic redundancy check CRC does not need to be added before coding. If polar coding is used, cyclic redundancy check (CRC) may be added or not added before coding. This is not specifically limited in this application.

After performing coding on the codebook, the terminal device needs to determine an uplink resource for feeding back the codebook to the network device, where the uplink resource includes a physical uplink control channel (PUCCH) or a physical uplink shared channel (PUSCH). The terminal device obtains, based on RRC signaling or MAC signaling, an uplink resource set configured by the network device for the terminal device, and then determines, from the uplink resource set based on HARQ-ACK resource indication information in DCI, an uplink resource for feeding back the codebook.

403: The terminal device feeds back the codebook to the network device.

After determining the uplink resource for feeding back the codebook, the terminal device feeds back the generated codebook to the network device by using the uplink resource. The network device receives the codebook generated by the terminal device, and determines a status of receiving the at least one downlink transmission by the terminal device.

It can be learned from the foregoing that, the codebook transmission method provided in this embodiment of this application is based on a new indication information generation method. A reference occasion corresponding to the at least one downlink transmission is obtained after the actual occasion corresponding to the at least one downlink transmission sent by the network device is offset by a configured occasion offset value, and the target frequency domain resource corresponding to the at least one downlink transmission is obtained, to determine a pair corresponding to the at least one downlink transmission, where a pair corresponding to the downlink transmission is pair of the target frequency domain resource corresponding to the downlink transmission and the reference occasion corresponding to the downlink transmission. Indication information corresponding to the at least one downlink transmission is determined based on the pair corresponding to the at least one downlink transmission. It may be understood that, the indication information is determined based on a reference occasion corresponding to a downlink transmission, and indication information corresponding to downlink transmissions at a same reference occasion can be generated in a same time period. Therefore, during preparation of indication information corresponding to one downlink transmission, existence of another downlink transmission may be known, and therefore indication information corresponding to the downlink transmission may be effectively generated. This avoids a problem that a C-DAI and a T-DAI that meet a prior-art arrangement rule cannot be generated in a prior-art manner of generating indication information.

In an implementation, a reference occasion is earlier than or equal to an actual occasion, or a reference occasion index is less than or equal to an actual occasion index.

The reference occasion is obtained after the actual occasion is offset by an occasion offset value. In this application, the reference occasion may be offset by the occasion offset value in a direction that an occasion becomes earlier. In one case, the reference occasion obtained after the offset is earlier than the actual occasion, that is, the reference occasion index obtained after the offset is less than the actual occasion index. For example, in FIG. 5a, the first occasion offset value is 4, and the actual occasion corresponding to the downlink transmission 1_3 is the occasion 4. After the actual occasion corresponding to the downlink transmission 1_3 is offset by the first occasion offset value, the corresponding reference occasion is the occasion 0. In this case, the occasion 0 is earlier than the occasion 4, and an index 0 is less than an index 4. In another case, the reference occasion obtained after the offset is equal to the actual occasion, that is, the reference occasion index is equal to the actual occasion index. For example, the second occasion offset value is 0, and the actual occasion corresponding to the downlink transmission 2_1 is the occasion 0. After the actual occasion corresponding to the downlink transmission 2_1 is offset by the second occasion offset value, the corresponding reference occasion is the occasion 0. In this case, the reference occasion and the actual occasion are both the occasion 0, and the reference occasion index is equal to the actual occasion index.

In another example, the reference occasion is later than or equal to the actual occasion.

Figure 5B:
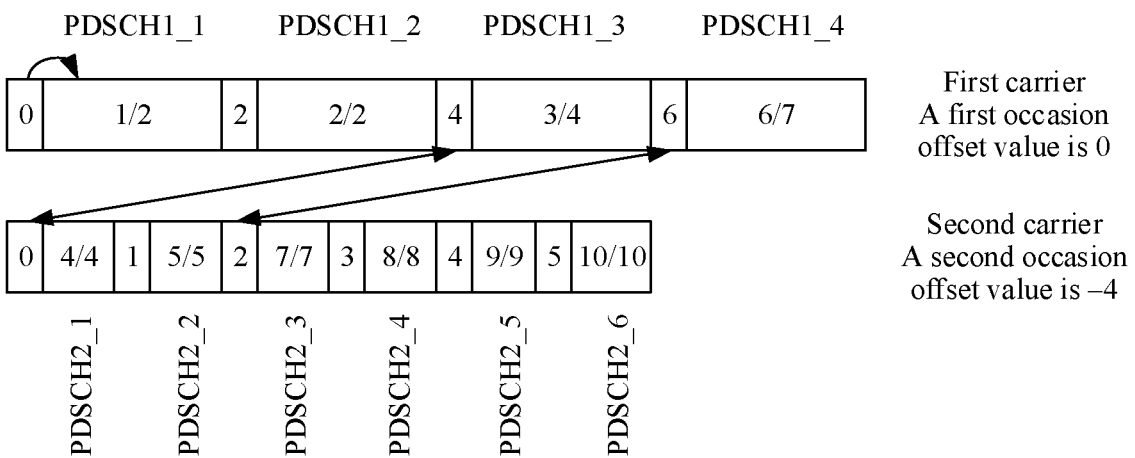

The reference occasion is obtained after the actual occasion is offset by an occasion offset value. In this application, the reference occasion may alternatively be offset by the occasion offset value in a direction that an occasion becomes later. The reference occasion obtained after the offset is later than the actual occasion, that is, the reference occasion index obtained after the offset is greater than the actual occasion index. For example, in FIG. 5b, the second occasion offset value is −4, and the actual occasion corresponding to the downlink transmission 2_1 is the occasion 0. After the actual occasion corresponding to the downlink transmission 2_1 is offset by the second occasion offset value, the corresponding reference occasion is the occasion 4. In this case, the occasion 4 is later than the occasion 0, and an index 4 is greater than an index 0.

In an implementation, the occasion offset value is independently configured for each of the at least two candidate frequency domain resources.

In another implementation, the occasion offset value is independently configured for the at least one target frequency domain resource.

In still another implementation, the occasion offset value is independently configured for at least one candidate frequency domain resource, and the occasion offset value is predefined for the at least one candidate frequency domain resource. For example, the network device configures two candidate frequency domain resources for the terminal device, and the network device configures an occasion offset value A1 for a candidate frequency domain resource H1, and predefines an occasion offset value A2 for a candidate frequency domain resource H2. The occasion offset value A2 may be predefined or may be configured via higher layer signaling for the candidate frequency domain resource H2. This is not limited in the present invention.

In still yet another implementation, the occasion offset value is independently configured for at least one candidate frequency domain resource, and no occasion offset value is defined for the at least one candidate frequency domain resource. For example, the network device configures two candidate frequency domain resources for the terminal device, and the network device configures an occasion offset value A1 for a candidate frequency domain resource H1, and does not define an occasion offset value for a candidate frequency domain resource H2. In other words, it may be considered that the occasion offset value is 0. The occasion offset value may be predefined or may be configured via higher layer signaling for the candidate frequency domain resource H2. This is not limited in the present invention.

The network device configures at least two candidate frequency domain resources for the terminal device via the higher layer signaling, and separately configures an occasion offset value for the at least two candidate frequency domain resources. In other words, occasion offset values corresponding to different candidate frequency domain resources may be different or may be the same. For example, the network device configures five candidate frequency domain resources for the terminal device. The network device configures an occasion offset value A1 for a candidate frequency domain resource H1, configures an occasion offset value A2 for a candidate frequency domain resource H2, configures an occasion offset value A3 for a candidate frequency domain resource H3, configures an occasion offset value A4 for a candidate frequency domain resource H4, and configures an occasion offset value A5 for a candidate frequency domain resource H5. The configured occasion offset values A1 to A5 may be the same or different from each other, or may be partially different. It may be understood that, during configuration of the occasion offset value, the occasion offset value may alternatively be configured for a candidate frequency domain resource group. One piece of RRC signaling is used to configure occasion offset values for at least two candidate frequency domain resource groups, where a same occasion offset value is configured for all candidate frequency domain resources in each candidate frequency domain resource group.

Certainly, the foregoing implementations are merely intended to describe manners of configuring an occasion offset value provided in this application more intuitively, and a quantity of candidate frequency domain resources is not limited to the quantity of candidate frequency domain resources described in the foregoing implementations.

Configuration 1: When the frequency domain resource is a serving cell, the occasion offset value is independently configured for each of the at least two candidate serving cells.

The network device configures the at least two candidate serving cells for the terminal device via the higher layer signaling, and independently configures an occasion offset value for each candidate serving cell. In other words, different serving cells correspond to independently configured occasion offset values. For example, the network device configures three candidate serving cells for the terminal device: a serving cell CC 1, a serving cell CC 2, and a serving cell CC3; and configures an occasion offset value B1 for the serving cell CC 1, configures an occasion offset value B2 for the serving cell CC 2, and configures an occasion offset value B3 for the serving cell CC3. The configured occasion offset values B1 to B3 may be the same or different from each other, or may be partially different. It may be understood that, during configuration of the occasion offset value, the occasion offset value may alternatively be configured for a candidate serving cell group. One piece of RRC signaling is used to configure occasion offset values for at least two candidate serving cell groups, where a same occasion offset value is configured for all candidate serving cells in each candidate serving cell group. It may be understood that the serving cell herein may also be referred to as a carrier.

Configuration 2: When the frequency domain resource is a carrier bandwidth part (C-BWP), the occasion offset value is independently configured for each of the at least two candidate C-BWPs.

A C-BWP is a set of consecutive physical resource blocks. Currently, a maximum of four C-BWPs can be configured for one terminal device on a downlink. If a supplementary uplink is configured for a terminal device, a maximum of four C-BWPs can be configured for the terminal device on an uplink, and a maximum of four C-BWPs can be configured for the terminal device on the supplementary uplink. The occasion offset value is independently configured for each of the at least two candidate C-BWPs. In other words, different candidate C-BWPs correspond to independently configured occasion offset values.

For example, the network device configures four C-BWPs for the terminal device: a C-BWP_1, a C-BWP_2, a C-BWP_3, and a C-BWP_3; and configures an occasion offset value C1 for the C-BWP_1, configures an occasion offset value C2 for the C-BWP_2, configures an occasion offset value C3 for the C-BWP_3, and configures an occasion offset value C4 for the C-BWP_4. The configured occasion offset values C1 to C4 may be the same or different from each other, or may be partially different. It may be understood that, during configuration of the occasion offset value, the occasion offset value may alternatively be configured for a candidate C-BWP group. One piece of RRC signaling is used to configure occasion offset values for at least two candidate C-BWP groups, where a same occasion offset value is configured for all candidate C-BWPs in each candidate C-BWP group.

Configuration 3: The actual occasion belongs to an actual occasion set, the actual occasion set includes at least two actual occasions, and the occasion offset value is independently configured for each of the at least two actual occasions in the actual occasion set.

For a predetermined actual occasion set that includes at least two actual occasions, occasion offset value is separately configured for each actual occasion. For example, the actual occasion set includes six actual occasions: an actual occasion S1, an actual occasion S2, an actual occasion S3, an actual occasion S4, an actual occasion S5, and an actual occasion S6. The network device separately configures an occasion offset value for each actual occasion, to be specific, configures an occasion offset value D1 for the actual occasion S1, configures an occasion offset value D2 for the actual occasion S2, configures an occasion offset value D3 for the actual occasion S3, configures an occasion offset value D4 for the actual occasion S4, configures an occasion offset value D5 for the actual occasion S5, and configures an occasion offset value D6 for the actual occasion S6. The configured occasion offset values D1 to D6 may be the same or different from each other, or may be partially different. It may be understood that, during configuration of the occasion offset value, the occasion offset value may alternatively be configured for an actual occasion group. One piece of RRC signaling is used to configure occasion offset values for at least two actual occasion groups, where a same occasion offset value is configured for all actual occasions in each actual occasion group. Different actual occasion groups may be defined based on different time periods or time-domain locations of actual occasions, for example, an actual occasion with a slot-level periodicity is different from an actual occasion with a non-slot level period. There are one or more actual occasion elements in an actual occasion set.

In another implementation of configuration 3, the occasion offset value is independently configured for at least one actual occasion.

In still another implementation of configuration 3, the occasion offset value is independently configured for at least one actual occasion, and the occasion offset value is predefined for the at least one actual occasion. For example, the network device configures two actual occasions for the terminal device, and the network device configures an occasion offset value D1 for an actual occasion S1, and predefines an occasion offset value D2 for an actual occasion S2. The occasion offset value D2 may be predefined or may be configured via higher layer signaling for the actual occasion S2. This is not limited in the present invention.

In still yet another implementation of configuration 3, the occasion offset value is independently configured for at least one actual occasion, and no occasion offset value is defined for the at least one actual occasion. For example, the network device configures two actual occasions for the terminal device, and the network device configures an occasion offset value D1 for an actual occasion S1, and does not define an occasion offset value for an actual occasion S2. In other words, it may be considered that the occasion offset value is 0. The occasion offset value may be predefined or may be configured via higher layer signaling for the actual occasion S2. This is not limited in the present invention.

Configuration 4: The downlink transmission is a PDSCH, time domain resource information of the target PDSCH is one of at least two pieces of time domain resource information, the occasion offset value is independently configured, and the time domain resource information includes a time domain length and/or a start symbol location.

For example, the time domain resource information includes the time domain length, where the time domain length of the PDSCH is a quantity of symbols occupied by the PDSCH. The occasion offset value is independently configured for a time domain length of a PDSCH to which a PDSCH reception occasion belongs, and may represent the time domain length. In other words, a different quantity of occupied time domain symbols indicates independent configuration of a corresponding occasion offset value. For example, the PDSCH reception occasion is one time domain symbol, and a configured occasion offset value is E1; the PDSCH reception occasion is two time domain symbols, and a configured occasion offset value is E2; and the PDSCH reception occasion is three time domain symbols, and a configured occasion offset value is E3. The configured occasion offset values E1 to E3 may be the same or different from each other, or may be partially different. It may be understood that, during configuration of the occasion offset value, the occasion offset value may alternatively be configured for a time domain length group. One piece of RRC signaling is used to configure occasion offset values for at least two time domain length groups, where a same occasion offset value is configured for all time domain lengths in each time domain length group. Different time domain length groups may be distinguished by lengths. For example, time domain lengths of 2 and 4 are in one time domain length group, lengths of 7 are in one time domain length group, and lengths of 14 are in one time domain length group. There are one or more time domain length elements in one time domain length group.

In another example, the time domain resource information includes the start symbol location. For different start symbol locations of time domain intervals of PDSCHs to which PDSCH reception occasions belong, corresponding occasion offset values are independently configured and may be the same or different.

For example, for time domain intervals 0 to 4 of PDSCHs to which PDSCH reception occasions belong, the start symbol location is 0, and the configured occasion offset value is F1; for time domain intervals 5 to 9 of PDSCHs to which PDSCH reception occasions belong, the start symbol location is 5, and the configured occasion offset value is F2. The configured occasion offset values F1 and F2 may be the same or different from each other, or may be partially different. It may be understood that, during configuration of the occasion offset value, the occasion offset value may alternatively be configured for a start symbol location group. One piece of RRC signaling is used to configure occasion offset values for at least two start symbol location groups, where a same occasion offset value is configured for all start symbol locations in each start symbol location group. Different start symbol location groups may be distinguished by start symbol indexes. For example, start symbol indexes of 0, 1, 2, and 3 are one start symbol location group, and lengths of 4 to 14 are one start symbol location group. There are one or more start symbol elements in one start symbol location group.

In still another implementation, the time domain resource information includes the time domain length and the start symbol location, and the occasion offset value is independently configured for different combinations of the time domain length and the start symbol location. Different combinations may be the same or different from each other, or may be partially different. It may be understood that, during configuration of the occasion offset value, the occasion offset value may alternatively be configured for a set of combinations of the start time domain length and the start symbol location. One piece of RRC signaling is used to configure time offset values for at least two sets of combinations of the start time domain length and the start symbol location, where a same time offset value is configured for all combinations of the start time domain length and the start symbol location in each set of combinations of the start time domain length and the start symbol location. There are one or more combination elements in one set of combinations.

In another implementation of configuration 4, the occasion offset value is independently configured for at least one piece of time domain resource information.

In still another implementation of configuration 4, the occasion offset value is independently configured for at least one piece of time domain resource information, and the occasion offset value is predefined for the at least one piece of time domain resource information. For example, the network device configures two pieces of time domain resource information for the terminal device, and the network device configures an occasion offset value Y1 for time domain resource information X1, and predefines an occasion offset value Y2 for time domain resource information X2. The occasion offset value Y2 may be predefined or may be configured via higher layer signaling for the time domain resource information X2. This is not limited in the present invention.

In still yet another implementation of configuration 4, the occasion offset value is independently configured for at least one piece of time domain resource information, and no occasion offset value is defined for the at least one piece of time domain resource information. For example, the network device configures two pieces of time domain resource information for the terminal device, and the network device configures an occasion offset value Y1 for time domain resource information X1, and does not define an occasion offset value for time domain resource information X2. In other words, it may be considered that the occasion offset value is 0. The occasion offset value may be predefined or may be configured via higher layer signaling for the time domain resource information X2. This is not limited in the present invention.

Configuration 5: A feedback time of the target downlink transmission is one of at least two feedback times, the occasion offset value is independently configured for the at least two feedback times, and the feedback time includes a time interval between a downlink transmission to feedback of feedback information corresponding to the downlink transmission.

The occasion offset value is independently configured for the feedback time corresponding to the downlink transmission, indicating that for different feedback times of the downlink transmission, a configured occasion offset value may be the same or different. For example, the feedback time corresponding to the downlink transmission is two slots, and the configured occasion offset value is G1; the feedback time corresponding to the downlink transmission is 2.5 slots, and the configured occasion offset value is G2; the feedback time corresponding to the downlink transmission is 3 slots, and the configured occasion offset value is G3. The configured occasion offset values G1 to G3 may be the same or different from each other, or may be partially different. It may be understood that, during configuration of the occasion offset value, the occasion offset value may alternatively be configured for a feedback time group. One piece of RRC signaling is used to configure occasion offset values for at least two feedback time groups, where a same occasion offset value is configured for all feedback times in each feedback time group. Different feedback time groups may be distinguished by time lengths. For example, feedback times of 0 slots to 1 slot are in one feedback time group, and feedback times of 2 to 3 slots are in one feedback time group. There are one or more feedback time elements in one feedback time group.

In another implementation of configuration 5, the occasion offset value is independently configured for at least one feedback time.

In still another implementation of configuration 5, the occasion offset value is independently configured for at least one feedback time, and the occasion offset value is predefined for the at least one feedback time. For example, the network device configures two feedback times for the terminal device, and the network device configures an occasion offset value G1 for a feedback time of 2 slots, and predefines an occasion offset value G2 for a feedback time of 0 slots. The occasion offset value G2 may be predefined or may be configured via higher layer signaling for the feedback time of 0 slots. This is not limited in the present invention.

In still yet another implementation of configuration 5, the occasion offset value is independently configured for at least one feedback time, and no occasion offset value is defined for the at least one feedback time. For example, the network device configures two feedback times for the terminal device, and the network device configures an occasion offset value G1 for a feedback time of 2 slots, and does not define an occasion offset value for a feedback time of 0 slots. In other words, it may be considered that the occasion offset value is 0. The occasion offset value may be predefined or may be configured via higher layer signaling for the feedback time of 0 slots. This is not limited in the present invention.

Configuration 6: The DCI that is used to schedule or carry the target downlink transmission is in one of at least two DCI formats, and the occasion offset value is independently configured for the at least two DCI formats.

The occasion offset value is independently configured for a DCI format, indicating that for different DCI that is used to schedule or carry the downlink transmission, configured occasion offset values may be the same or different. For example, the DCI may be in a DCI format 1-0 or a DCI format 1-1, and an occasion offset value H1 is configured for the DCI format 1-0 and the DCI format 1-1. The DCI may further be in a compact DCI format, and an occasion offset value H2 is configured for the compact DCI format. The configured occasion offset values H1 and H2 may be the same or different from each other, or may be partially different. It may be understood that, during configuration of the occasion offset value, the occasion offset value may alternatively be configured for a DCI format group. One piece of RRC signaling is used to configure occasion offset values for at least two DCI format groups, where a same occasion offset value is configured for all DCI formats in DCI format group. Different DCI format groups may be distinguished by a DCI payload size. For example, a DCI format 1_0 and a DCI format 1_1 are in one DCI format group, and lengths of DCI format 3 are in one DCI format group. There are one or more DCI formats in one DCI format group.

In another implementation of configuration 6, the occasion offset value is independently configured for at least one DCI format.

In still another implementation of configuration 6, the occasion offset value is independently configured for at least one DCI format, and the occasion offset value is predefined for the at least one DCI format. For example, the network device configures two DCI formats for the terminal device, and the network device configures an occasion offset value H1 for a DCI format 1-0 and a DCI format 1-1, and predefines an occasion offset value H2 for a compact DCI format. The occasion offset value H2 may be predefined or may be configured via higher layer signaling. This is not limited in the present invention.

In still yet another implementation of configuration 6, the occasion offset value is independently configured for at least one feedback time, and the occasion offset value is not defined for the at least one DCI format. For example, the network device configures two DCI formats for the terminal device, and the network device configures an occasion offset value H1 for a DCI format 1-0 and a DCI format 1-1, and predefines an occasion offset value H2 for a compact DCI format. In other words, it may be considered that the occasion offset value is 0. The occasion offset value may be predefined or may be configured via higher layer signaling for the compact DCI format. This is not limited in the present invention.

Configuration 7: A scheduling time interval of the target downlink transmission is one of at least two scheduling time intervals, the occasion offset value is independently configured for the at least two scheduling time intervals, and the scheduling time interval includes a time interval between a downlink transmission to a PDCCH that schedules or carries the downlink transmission.

The occasion offset value is independently configured for the time interval between a downlink transmission to a PDCCH that schedules or carries the downlink transmission, that is, scheduling time intervals of the downlink transmission and the PDCCH are different, and the configured occasion offset value may be the same or different. For example, a scheduling time interval between the downlink transmission and the PDCCH is 0 time domain symbols, and a configured occasion offset value is I1; a scheduling time interval between the downlink transmission and the PDCCH is 2 time domain symbols, and a configured occasion offset value is I2; and a time interval between the downlink transmission and the PDCCH is 4 time domain symbols, and a configured occasion offset value is I3. The configured occasion offset values I1 to I3 may be the same or different from each other, or may be partially different. It may be understood that, during configuration of the occasion offset value, the occasion offset value may alternatively be configured for a scheduling time interval group. One piece of RRC signaling is used to configure occasion offset values for at least two scheduling time interval groups, where a same occasion offset value is configured for all scheduling time intervals in each scheduling time interval group. Different scheduling time interval groups may be distinguished by time lengths. For example, scheduling time intervals of 0 slots are in one scheduling time interval group, and scheduling time intervals of 1 or more symbols are in one scheduling time interval group. There are one or more scheduling time interval elements in one scheduling time interval group.

In another implementation of configuration 7, the occasion offset value is independently configured for at least one scheduling time interval.

In still another implementation of configuration 7, the occasion offset value is independently configured for at least one scheduling time interval, and the occasion offset value is predefined for the at least one scheduling time interval. For example, the network device configures two scheduling time intervals for the terminal device, and the network device configures an occasion offset value I1 for a scheduling time interval of 1 slot, and predefines an occasion offset value I2 for a scheduling time interval of 0 symbols. The occasion offset value I2 may be predefined or may be configured via higher layer signaling. This is not limited in the present invention.

In still yet another implementation of configuration 7, the occasion offset value is independently configured for at least one scheduling time interval, and no occasion offset value is defined for the at least one scheduling time interval. For example, the network device configures two scheduling time intervals for the terminal device, and the network device configures an occasion offset value I1 for a scheduling time interval of 1 slot, and does not define an occasion offset value for a scheduling time interval of 0 symbols. In other words, it may be considered that the occasion offset value is 0. The occasion offset value may be predefined or may be configured via higher layer signaling for the scheduling time interval. This is not limited in the present invention.

In an example, the first configuration of the occasion offset value may be used in combination with any one of the third to the seventh configurations of the occasion offset value. Likewise, the second configuration of the occasion offset value may also be used in combination with any one of the third to the seventh configurations of the occasion offset value.

In an implementation, the occasion offset value is a quantity of occasions.

The occasion may be a physical downlink control channel PDCCH monitoring occasion at which downlink control information DCI that is used to schedule or carry the target downlink transmission is located, or a physical downlink shared channel PDSCH receiving occasion at which the target downlink transmission is located.

In another implementation, the occasion offset value is an offset time period, and a reference occasion obtained after an actual occasion is offset by the offset time periodicity is an occasion obtained after an actual occasion corresponding to the downlink transmission is offset by the quantity of occasions, where the quantity of occasions is a quantity of occasions within the offset time period.

Further, there are two methods herein for determining the reference occasion:

Determining method 1: A reference occasion is determined after a current actual occasion is offset by an occasion offset value of a total accumulative quantity of actual occasions on all frequency domain resources. Specifically, a current actual occasion is determined, the current actual occasion is determined as an end time, a time obtained after the current actual occasion is offset forward by an offset time periodicity or is offset backward by an offset time periodicity is determined as a start time, and a quantity of occasions on all candidate frequency domain resources within the offset time periodicity is determined as a quantity of occasions. If the current actual occasion is a time A, a quantity of occasions within a time periodicity {time A–offset time periodicity to time A} or {time A to time A+offset time period} is used as the quantity of occasions.

Determining method 2: A reference occasion is determined after a current actual occasion is offset by an occasion offset value of a quantity of actual occasions on each frequency domain resource. Specifically, a current actual occasion is determined, the current actual occasion is determined as an end time, a time obtained after the current actual occasion is offset forward by an offset time periodicity or is offset backward by an offset time periodicity is determined as a start time, and a quantity of occasions on a current target frequency domain resource within the offset time periodicity is determined as a quantity of occasions. If the current actual occasion is a time A, a quantity of occasions within a time periodicity {time A–offset time periodicity to time A} or {time A to time A+offset time period} is used as the quantity of occasions.

In an implementation, a combination of the actual occasion and the occasion offset value may be any one of the following:

combination 1: The actual occasion is the PDCCH monitoring occasion, and the occasion offset value is an occasion offset value of the PDCCH monitoring occasion;

combination 2: The actual occasion is the PDSCH reception occasion, and the occasion offset value is an occasion offset value of a candidate PDSCH reception occasion;

combination 3: The actual occasion is the PDCCH monitoring occasion, and the occasion offset value is an occasion offset value of a candidate PDSCH reception occasion; or combination 4: The actual occasion is the PDSCH reception occasion, and the occasion offset value is an occasion offset value of a PDCCH monitoring occasion.

It may be understood that, when the actual occasion is the PDCCH monitoring occasion, the occasion offset value may be the occasion offset value of the PDCCH monitoring occasion, or may be the occasion offset value of the candidate PDSCH reception occasion.

When the actual occasion is the PDSCH reception occasion, the occasion offset value may be the occasion offset value of the candidate PDSCH reception occasion, or may be the occasion offset value of the PDCCH monitoring occasion.

In an implementation, subcarrier spacings of the at least two candidate frequency domain resources are different; and/or, at least one occasion periodicity on the at least two candidate frequency domain resources is different.

In the at least two candidate frequency domain resources configured by the network device for the terminal device, subcarrier spacings of the candidate frequency domain resources are different. For example, the network device configures two candidate frequency domain resources for the terminal device, where a subcarrier spacing of one candidate frequency domain resource is 15 kHz, and a subcarrier spacing of the other candidate frequency domain resource is 30 kHz.

At least one occasion periodicity on each of the at least two candidate frequency domain resources configured by the network device for the terminal device is different. In other words, different candidate frequency domain resources have different occasion periods, and the occasion periodicity includes a periodicity of the PDCCH monitoring occasion or a periodicity of the PDSCH reception occasion. For example, the network device configures two candidate frequency domain resources for the terminal device, where an occasion periodicity of one candidate frequency domain resource is 5 time domain symbols, and an occasion periodicity of the other candidate frequency domain resource is 7 time domain symbols.

In this application, the occasion may be one of the following in a time domain resource: one or more symbols (indexes), one or more slots (indexes), and one or more time units (indexes). One time unit includes one or more symbols.

Solution 2:

In an NR system, a plurality of time scheduling units are supported. Time scheduling in a slot is generally referred to as slot scheduling, and time scheduling in a symbol is generally referred to as non-slot scheduling. A length of the non-slot scheduling may be one or more time domain symbols, and the time domain symbol is an OFDM (orthogonal frequency division multiplexing,) symbol.

In the NR system, different subcarrier spacings are further supported. For one subframe, a larger subcarrier spacing indicates a shorter length of one OFDM time domain symbol and fewer time domain resources occupied by one slot. As shown in Table 1, when $\mu$ is 0, the subcarrier spacing is 15 kHz, and in this case, a quantity of slots in a subframe whose length is 1 millisecond is 1. When $\mu$ is 1, the subcarrier spacing is 30 kHz, and in this case, a quantity of slots in a subframe whose length is 1 millisecond is 2. When $\mu$ is 2, the subcarrier spacing is 60 kHz, and in this case, a quantity of slots in a subframe whose length is 1 millisecond is 4. When $\mu$ is 3, the subcarrier spacing is 120 kHz, and in this case, a quantity of slots in a subframe whose length is 1 millisecond is 8. When $\mu$ is 4, the subcarrier spacing is 240 kHz, and in this case, a quantity of slots in a subframe whose length is 1 millisecond is 16.

TABLE 1

| $\mu$ | Subcarrier spacing $\Delta f = 2^\mu \cdot 15 [kHz]$ | Cyclic prefix |
| --- | --- | --- |
| 0 | 15 | Normal |
| 1 | 30 | Normal |
| 2 | 60 | Normal, extended |
| 3 | 120 | Normal |
| 4 | 240 | Normal |

Figure 7:
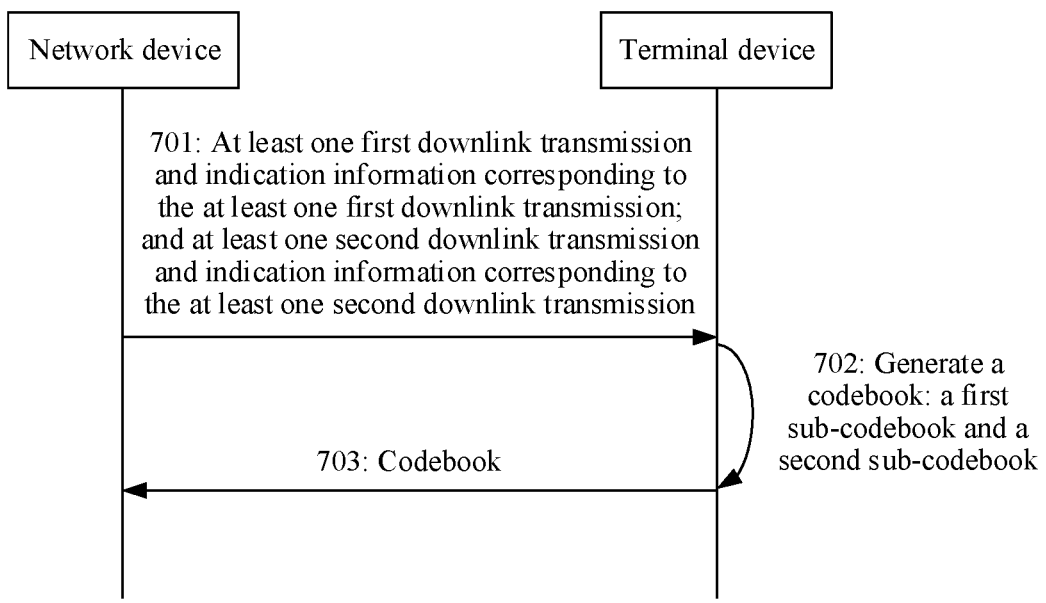
FIG. 7 is a sequence diagram of another codebook transmission method according to an embodiment of this application.

FIG. 7 shows another codebook transmission method according to an embodiment of this application. In this embodiment, different from the embodiment shown in FIG. 4, at least one downlink transmission is grouped based on an actual time domain resource or a reference time domain resource on which the downlink transmission is located, and a time domain resource set to which the downlink transmission belongs is determined. During determining of indication information corresponding to the downlink transmission, time domain resource sets are independent of each other. The following describes in detail the method shown in FIG. 7.

701: A network device sends, to a terminal device, at least one first downlink transmission and indication information corresponding to the at least one first downlink transmission, where an actual time domain resource on which the first downlink transmission is located or a reference time domain resource corresponding to the first downlink transmission belongs to a first time domain resource set; and the network device sends, to the terminal device, at least one second downlink transmission and indication information corresponding to the at least one second downlink transmission, where an actual time domain resource on which the second downlink transmission is located or a reference time domain resource corresponding to the second downlink transmission belongs to a second time domain resource set.

The first downlink transmission may be a downlink PDSCH scheduled by a PDCCH, or the first downlink transmission may be a PDCCH used to indicate SPS activation, or the first downlink transmission may be a PDCCH used to indicate SPS release.

The second downlink transmission may be a downlink PDSCH scheduled by a PDCCH, or the second downlink transmission may be a PDCCH used to indicate SPS activation, or the second downlink transmission may be a PDCCH used to indicate SPS release.

Before sending the at least one first downlink transmission and the at least one second downlink transmission to the terminal device, the network device needs to determine the indication information corresponding to the at least one first downlink transmission and the indication information corresponding to the at least one second downlink transmission. The indication information includes a C-DAI, or the indication information includes a C-DAI and a T-DAI. The following describes in detail an implementation process of determining the indication information. In one case, one first downlink transmission corresponds to one piece of indication information. In another case, a plurality of first downlink transmissions correspond to one piece of indication information. This is not specifically limited in this application. Similarly, in one case, one second downlink transmission corresponds to one piece of indication information. In another case, a plurality of second downlink transmissions correspond to one piece of indication information. This is not specifically limited in this application.

Before the indication information is determined, a preset reference subcarrier spacing and a preset reference time domain resource set are preset. It may be understood that the preset reference subcarrier spacing and the preset reference time domain resource set are configured for the terminal device via higher layer signaling. Optionally, a correspondence between the preset reference subcarrier spacing and the preset reference time domain resource set may be further configured for the terminal device via the higher layer signaling. Generally, there are a plurality of preset reference time domain resource sets, and there is no same time domain resource in any two reference time domain resource sets in different reference time domain resource sets. The time domain resource may correspond to a quantity of symbols and/or a quantity of slots. The quantity of symbols is used as an example. If the preset reference subcarrier spacing is 15 kHz, a preset first reference time domain resource set includes 1-symbol to 4-symbol time domain resources; a preset second reference time domain resource set includes 5-symbol to 8-symbol time domain resources; and a preset third reference time domain resource set includes 9-symbol to 14-symbol time domain resources.

Optionally, there are at least two following implementations of determining that the first downlink transmission belongs to the first time domain resource set and that the second downlink transmission belongs to the second time domain resource set:

Implementation 1: The first time domain resource set is an actual time domain resource set, and/or the second time domain resource set is an actual time domain resource set:

The first time domain resource set is determined based on an actual subcarrier spacing of a frequency domain resource on which the first downlink transmission is located, the preset reference subcarrier spacing, and the preset first reference time domain resource set; and/or the second time domain resource set is determined based on an actual subcarrier spacing of a frequency domain resource on which the second downlink transmission is located, the preset reference subcarrier spacing, and the preset second reference time domain resource set.

If the preset reference subcarrier spacing and a time domain resource element included in each preset reference time domain resource set are known, a time domain resource element, at the actual subcarrier spacing, included in an actual time domain resource set corresponding to each preset reference time domain resource set may be determined based on the actual subcarrier spacing of the frequency domain resource on which the first downlink transmission is located. The time domain resource element is a quantity of time domain symbols or a quantity of slot symbols. It may be understood that a time domain resource element included in a preset reference time domain resource set is a value range of a quantity of reference time domain symbols, or a value range of a quantity of reference slot symbols included in the preset reference time domain resource set. A time domain resource element included in an actual time domain resource set is a value range of a quantity of actual time domain symbols, or a value range of a quantity of actual slot symbols included in the actual time domain resource set.

In an implementation, the actual time domain resource is determined based on the reference time domain resource by using a formula (1):

$$N_r = N_0 \cdot 2^{\mu_r - \mu_0} \quad (1), \text{where}$$

$N_r$ represents the actual time domain resource, $N_0$ represents the reference time domain resource, $\mu_r$ represents the actual subcarrier spacing, and $\mu_0$ represents the reference subcarrier spacing.

Then, the actual time domain resource set corresponding to each preset reference time domain resource set is determined according to the formula (1), the actual subcarrier spacing, the preset reference subcarrier spacing, and the preset reference time domain resource set.

After the actual time domain resource set corresponding to each preset reference time domain resource set is determined, an actual time domain resource corresponding to the first downlink transmission is obtained, and an actual time domain resource set to which the actual time domain resource belongs is determined, where the first time domain resource set is a resource set to which the actual time domain resource belongs. Likewise, an actual time domain resource corresponding to the second downlink transmission is obtained, and an actual time domain resource set to which the actual time domain resource belongs is determined, where the second time domain resource set is a resource set to which the actual time domain resource belongs.

For example, the preset reference subcarrier spacing is 15 kHz, and the actual subcarrier spacing is 30 kHz. In this case, the preset first reference time domain resource set includes 1-symbol to 3-symbol time domain resources, the preset first reference time domain resource set corresponds to a first actual time domain resource set, and the first actual time domain resource set includes 2-symbol to 6-symbol time domain resources; the preset second reference time domain resource set includes 4-symbol to 7-symbol time domain resources, the preset second reference time domain resource set corresponds to a second actual time domain resource set, and the second actual time domain resource set includes 8-symbol to 14-symbol time domain resources; and the preset third reference time domain resource set includes 8-symbol to 11-symbol time domain resources, the preset third reference time domain resource set corresponds to a third actual time domain resource set, and the third actual time domain resource set includes 16-symbol to 22-symbol time domain resources.

If the actual time domain resource corresponding to the first downlink transmission includes 6 symbols, and the first actual time domain resource set includes a 6-symbol time domain resource, the actual time domain resource belongs to the first actual time domain resource set. If the actual time domain resource corresponding to the second downlink transmission includes 18 symbols, and the third actual time domain resource set includes an 18-symbol time domain resource, the actual time domain resource belongs to the third actual time domain resource set.

In an example, a preset correction value may be further introduced. In a scenario, the reference time domain resource set is first corrected by using the preset correction value, and then the actual time domain resource set is determined according to the formula (1). In this case, the formula (1) is transformed into the following formula (2):

$$N_r = (N_0 \pm i) \cdot 2^{\mu_r - \mu_0} \quad (2),\text{ where}$$

i is the preset correction value.

In another scenario, the actual time domain resource set is first determined according to the formula (1), and then the actual time domain resource set is corrected by using the preset correction value. In this case, the formula (1) is transformed into the following formula (3):

$$N_r = N_0 \cdot 2^{\mu_r - \mu_0} \quad (3),\text{ where}$$

i is the preset correction value.

Implementation 2: The first time domain resource set and/or the second time domain resource set are/is an actual time domain resource set.

The reference time domain resource corresponding to the first downlink transmission is determined based on the actual time domain resource on which the first downlink transmission is located, an actual subcarrier spacing of a frequency domain resource on which the first downlink transmission is located, and the preset reference subcarrier spacing; and/or the reference time domain resource corresponding to the second downlink transmission is determined based on the actual time domain resource on which the second downlink transmission is located, an actual subcarrier spacing of a frequency domain resource on which the second downlink transmission is located, and the preset reference subcarrier spacing.

If the preset reference subcarrier spacing and a time domain resource element included in each preset reference time domain resource set are known, a reference time domain resource corresponding to the actual time domain resource on which the first downlink transmission is located may be determined based on the actual subcarrier spacing of the frequency domain resource on which the first downlink transmission is located and the preset reference subcarrier spacing.

In an implementation, the reference time domain resource is determined based on the actual time domain resource by using a formula (4):

$$N_0 = N_r \cdot 2^{\mu_0 - \mu_r} \quad (4),\text{ where}$$

$N_r$ represents the actual time domain resource, $N_0$ represents the reference time domain resource, $\mu_r$ represents the actual subcarrier spacing, and $\mu_0$ represents the reference subcarrier spacing.

After a reference time domain resource corresponding to the first downlink transmission is determined, a reference time domain resource set to which the reference time domain resource corresponding to the first downlink transmission belongs is determined, where the reference time domain resource set is the first time domain resource set.

Likewise, a reference time domain resource corresponding to the actual time domain resource on which the second downlink transmission is located may be determined based on the actual subcarrier spacing of the frequency domain resource on which the second downlink transmission is located and the preset reference subcarrier spacing. After a reference time domain resource corresponding to the second downlink transmission is determined, a reference time domain resource set to which the reference time domain resource corresponding to the second downlink transmission belongs is determined, where the reference time domain resource set is the second time domain resource set.

For example, if the preset reference subcarrier spacing is 15 kHz, a preset first reference time domain resource set includes 1-symbol to 3-symbol time domain resources, a preset second reference time domain resource set includes 4-symbol to 7-symbol time domain resources; and a preset third reference time domain resource set includes 8-symbol to 11-symbol time domain resources.

An actual subcarrier spacing corresponding to the first downlink transmission is 30 kHz, and an actual time domain resource corresponding to the first downlink transmission includes 4 symbols. In this case, the reference time domain resource corresponding to the first downlink transmission includes 2 symbols, the first reference time domain resource set includes a 2-symbol time domain resource, and therefore, the reference time domain resource corresponding to the first downlink transmission belongs to the first reference time domain resource set.

An actual subcarrier spacing corresponding to the second downlink transmission is 60 kHz, and an actual time domain resource corresponding to the second downlink transmission includes 32 symbols. In this case, the reference time domain resource corresponding to the second downlink transmission includes 8 symbols, the third reference time domain resource set includes an 8-symbol time domain resource, and therefore, the reference time domain resource corresponding to the second downlink transmission belongs to the third reference time domain resource set.

It should be noted herein that the reference time domain resource set and the actual time domain resource set described in the foregoing include consecutive symbols. In an actual application scenario, the reference time domain resource set and the actual time domain resource set may alternatively include discrete symbols. Details are not described herein.

After the first time domain resource set to which the first downlink transmission belongs is determined, the at least one first downlink transmission in the first time domain resource is sequenced first in ascending order of frequency domain resource index, and then in ascending order of occasion index, to determine the C-DAI corresponding to the at least one first downlink transmission; and then is sequenced in ascending order of occasion index, to determine the T-DAI corresponding to the at least one first downlink transmission. Therefore, the indication information corresponding to the at least one first downlink transmission is obtained.

During specific implementation, a pair corresponding to the first downlink transmission is defined, and the pair corresponding to the first downlink transmission includes a pair of a frequency domain resource and an actual occasion corresponding to the first downlink transmission. During determining of the C-DAI corresponding to the at least one first downlink transmission, the pair corresponding to the at least one downlink transmission is sequenced in a first preset order, where the first preset order indicates that the pair is sequenced first in ascending order of frequency domain resource index, and then in ascending order of occasion index. An ascending order of frequency domain resource index is an order of frequency domain resource indexes from small to large. An ascending order of occasion index is an order of occasion indexes from small to large, or an order of occasions from early to late.

After the pair corresponding to the at least one first downlink transmission is sequenced in the first preset order, indication information corresponding to a target downlink transmission in the at least one first downlink transmission is determined in the following manner: A value of the C-DAI corresponding to the first downlink transmission is an accumulative quantity of pairs, up to a current pair, corresponding to the at least one first downlink transmission that are sequenced in the first preset order.

In another implementation, during determining of the T-DAI corresponding to the at least one first downlink transmission, the pair corresponding to the at least one first downlink transmission is sequenced in a second preset order, where the second preset order is an ascending order of actual occasion index. The ascending order of actual occasion indexes is an order of actual occasion indexes from small to large, or an order of actual occasions from early to late.

After the pair corresponding to the at least one first downlink transmission is sequenced in the second preset order, the indication information corresponding to the at least one first downlink transmission is determined in the following manner: A value of the T-DAI corresponding to the first downlink transmission is a total quantity of pairs, up to a current actual occasion, corresponding to the at least one first downlink transmission that are sequenced in the second preset order.

Similarly, after the second time domain resource set to which the second downlink transmission belongs is determined, the at least one second downlink transmission in the second time domain resource is sequenced first in ascending order of frequency domain resource index, and then in ascending order of occasion index, to determine the C-DAI corresponding to the at least one second downlink transmission; and then is sequenced in ascending order of occasion index, to determine the T-DAI corresponding to the at least one second downlink transmission. Therefore, the indication information corresponding to the at least one second downlink transmission is obtained. A specific implementation of determining the indication information corresponding to the at least one second downlink transmission is similar to the implementation of determining the indication information corresponding to at least one first downlink transmission. Details are not described herein again.

702: The terminal device generates a codebook, where the codebook includes a first sub-codebook and a second sub-codebook.

The terminal device receives the at least one first downlink transmission and the indication information corresponding to the at least one first downlink transmission sent by the network device. According to the manner described in 701, it is determined that the actual time domain resource on which the at least one first downlink transmission is located or the reference time domain resource corresponding to the at least one first downlink transmission belongs to the first time domain resource set. Details are not described herein again.

The terminal device receives the at least one second downlink transmission and the indication information corresponding to the at least one second downlink transmission sent by the network device. According to the manner described in 701, it is determined that the actual time domain resource on which the at least one second downlink transmission is located or the reference time domain resource corresponding to the at least one second downlink transmission belongs to the second time domain resource set. Details are not described herein again.

When generating the codebook, the terminal device generates one first sub-codebook for the at least one first downlink transmission that belongs to the first time domain resource set, where the first sub-codebook includes at least one piece of first feedback information corresponding to the at least one first downlink transmission; and generates one second sub-codebook for the at least one second downlink transmission that belongs to the second time domain resource set, where the second sub-codebook includes at least one piece of second feedback information corresponding to the at least one second downlink transmission.

The first sub-codebook and the second sub-codebook are generated independently of each other. Before generating the first sub-codebook, the terminal device first determines the indication information corresponding to the at least one first downlink transmission in the first time domain resource set. In one case, the terminal device receives the indication information corresponding to the at least one first downlink transmission sent by the network device via DCI. In another case, after determining that the actual time domain resource on which the at least one first downlink transmission is located or the reference time domain resource corresponding to the at least one first downlink transmission belongs to the first time domain resource set, the terminal device determines, based on a frequency domain resource and an actual occasion corresponding to the at least one first downlink transmission in the first time domain resource set, the indication information corresponding to the at least one first downlink transmission. For a specific implementation, refer to 701. Details are not described herein again.

After determining the indication information corresponding to the at least one first downlink transmission in the first time domain resource set, the terminal device generates the first sub-codebook, where a location, of the first feedback information corresponding to the first downlink transmission, in the first sub-codebook corresponds to the indication information that is corresponding to the first downlink transmission.

Similarly, before generating the second sub-codebook, the terminal device first determines the indication information corresponding to at least one second downlink transmission in the second time domain resource set. In one case, the terminal device receives the indication information corresponding to the at least one second downlink transmission sent by the network device via the DCI. In another case, after determining that the actual time domain resource on which the at least one second downlink transmission is located or the reference time domain resource corresponding to the at least one second downlink transmission belongs to the second time domain resource set, the terminal device determines, based on a frequency domain resource and an actual occasion corresponding to the at least one second downlink transmission in the second time domain resource set, the indication information corresponding to the at least one second downlink transmission. For a specific implementation, refer to 701. Details are not described herein again.

After determining the indication information corresponding to the at least one second downlink transmission in the first time domain resource set, the terminal device generates the second sub-codebook, where a location, of the second feedback information corresponding to the second downlink transmission, in the second sub-codebook corresponds to the indication information that is corresponding to the second downlink transmission.

703: The terminal device sends the codebook to the network device.

After receiving the codebook sent by the terminal device, the network device obtains, based on the first sub-codebook in the codebook, the at least one piece of first feedback information corresponding to the at least one first downlink transmission in the first sub-codebook, and learns a feedback result of receiving the first downlink transmission by the terminal device; and obtains, based on the second sub-codebook in the codebook, the at least one piece of second feedback information corresponding to the at least one second downlink transmission in the second sub-codebook, and learns a feedback result of receiving the second downlink transmission by the terminal device.

In an example, a time domain resource element in the first time domain resource set is predefined; and a time domain resource element in the second time domain resource set is independently configured.

In actual application, the time domain resource element in the first time domain resource set may be predefined in a protocol, to be specific, a value interval of a quantity of symbols in the first time domain resource set may be defined. A range of the defined time domain resource element is 2 to 14 symbols. For example, the first time domain set includes a 2-symbol time domain resource and a 4-symbol time domain resource. For another example, the first time domain set includes a 14-symbol time domain resource. For another example, the first time domain set includes a 7-symbol resource. After the time domain resource element in the first time domain resource set is predefined in the protocol, the time domain resource element in the first time domain resource set is not configurable. In this way, generation of a sub-codebook corresponding to the first time domain resource set may not be affected in a process in which another element is configured through RRC signaling or not be affected when there is no RRC signaling configuration.

The time domain resource element in the second time domain resource set is independently configured. In other words, the time domain resource element in the second time domain resource set is configurable.

It should be noted herein that the first time domain resource set and the second time domain resource set are not specific but general. To be specific, in a specific implementation scenario, one time domain resource set is predefined in the protocol, and another time domain resource set is independently configured.

In an example, the first sub-codebook is located before the second sub-codebook in the codebook, or the first sub-codebook is located after the second sub-codebook in the codebook.

After the first sub-codebook and the second sub-codebook are generated, the first sub-codebook may be located before the second sub-codebook in the codebook, or may be located after the second sub-codebook in the codebook. Because the first sub-codebook and the second sub-codebook are generated independently of each other, the first sub-codebook and the second sub-codebook in the codebook are not subject to a specific order.

It can be learned from the foregoing that, the at least one downlink transmission is grouped based on a time domain resource set to which the actual time domain resource on which the at least one downlink transmission is located or the reference time domain resource corresponding to the at least one downlink transmission belongs, to obtain the at least one first downlink transmission that belongs to the first time domain resource set and the at least one second downlink transmission that belongs to the second time domain resource set. Indication information corresponding to the first time domain resource set and indication information corresponding to the second time domain resource set are generated independently of each other. Generally, a downlink transmission that occupies more time domain resources requires a longer preparation time; a downlink transmission that occupies fewer time domain resources requires a shorter preparation time. Downlink transmissions that occupy similar time domain resources are grouped into one group, so that indication information can be accurately and effectively generated. This avoids a problem that a C-DAI and a T-DAI that meet a prior-art arrangement rule cannot be generated due to a relatively large preparation time difference.

Figure 8:
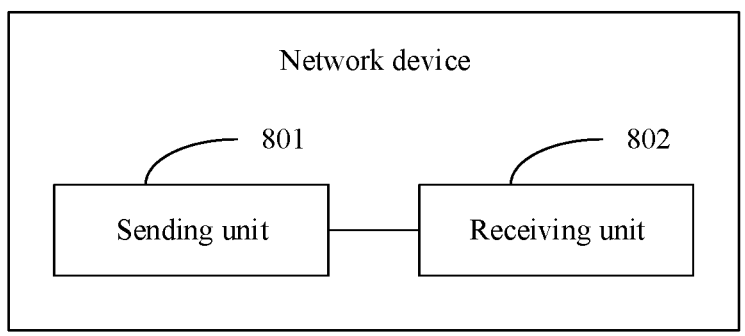
FIG. 8 is a schematic structural diagram of a network device according to an embodiment of this application.

Example Apparatus:

FIG. 8 is a schematic structural diagram of a network device according to an embodiment of this application. The network device includes:

a sending unit 801, configured to send at least one downlink transmission and indication information corresponding to the at least one downlink transmission, where the at least one downlink transmission includes a target downlink transmission, the target downlink transmission corresponds to an actual occasion, the target downlink transmission corresponds to a pair of a frequency domain resource and a reference occasion, the reference occasion is an occasion obtained after the actual occasion corresponding to the target downlink transmission is offset by an occasion offset value, and the indication information includes a counter downlink assignment indicator C-DAI, or the indication information includes the C-DAI and a total downlink assignment indicator T-DAI; and a receiving unit 802, configured to receive a codebook, where the codebook includes at least one piece of feedback information corresponding to the at least one downlink transmission, and a location, of feedback information corresponding to the target downlink transmission, in the codebook corresponds to indication information that is corresponding to the target downlink transmission.

The actual occasion is a physical downlink control channel PDCCH monitoring occasion at which downlink control information DCI that is used to schedule or carry the target downlink transmission is located, or the actual occasion is a physical downlink shared channel PDSCH reception occasion at which the target downlink transmission is located.

Optionally, the network device further includes:

a configuration unit, configured to configure the occasion offset value via higher layer signaling or downlink control information DCI.

Optionally, the pair is a current pair, and a value of a C-DAI corresponding to the target downlink transmission is an accumulative quantity of pairs up to the current pair, and the current pair is a pair of a current reference occasion and a current target frequency domain resource, where the accumulative quantity of pairs is an accumulative quantity of pairs corresponding to the at least one downlink transmission that are sequenced in a first preset order, and the first preset order indicates that the pair is sequenced first in ascending order of frequency domain resource index and then in ascending order of reference occasion index.

Optionally, a value of a T-DAI corresponding to the target downlink transmission is a total quantity of pairs up to the current reference occasion, the total quantity of pairs is a value obtained after a total quantity of pairs corresponding to the target downlink transmission is updated based on a second preset order, and the second preset order is an ascending order of reference occasion index.

Optionally, the reference occasion is earlier than or equal to the actual occasion, or an index of the reference occasion is less than or equal to an index of the actual occasion.

Optionally, the frequency domain resource is one of at least two candidate frequency domain resources, and the occasion offset value is independently configured for each of the at least two candidate frequency domain resources.

Optionally, that the occasion offset value is independently configured for each of the at least two candidate frequency domain resources includes:

the frequency domain resource is a serving cell, and the occasion offset value is independently configured for each of the at least two candidate serving cells; or the frequency domain resource is a carrier bandwidth part C-BWP of a serving cell, and the occasion offset value is independently configured for each of the at least two candidate C-BWPs.

Optionally, the occasion offset value is configured by using any one of the following implementations:

implementation 1: The actual occasion belongs to an actual occasion set, the actual occasion set includes at least two actual occasions, and the occasion offset value is independently configured for each of the at least two actual occasions in the actual occasion set;

implementation 2: The DCI that is used to schedule or carry the target downlink transmission is in one of at least two DCI formats, and the occasion offset value is independently configured for the at least two DCI formats;

implementation 3: A scheduling time interval of the target downlink transmission is one of at least two scheduling time intervals, the occasion offset value is independently configured for the at least two scheduling time intervals, and the scheduling time interval includes a time interval between a downlink transmission to a PDCCH that schedules or carries the downlink transmission;

implementation 4: A feedback time of the target downlink transmission is one of at least two feedback times, the occasion offset value is independently configured for the at least two feedback times, and the feedback time includes a time interval between a downlink transmission to feedback of feedback information corresponding to the downlink transmission; or implementation 5: The downlink transmission is a PDSCH, time domain resource information of the target PDSCH is one of at least two pieces of time domain resource information, the occasion offset value is independently configured, and the time domain resource information includes a time domain length and/or a start symbol location.

Optionally, the occasion offset value is an offset time period, the reference occasion is an occasion obtained after an actual occasion corresponding to the downlink transmission is offset by a quantity of occasions, and the quantity of occasions is a quantity of occasions within the offset time period.

Optionally, a combination of the actual occasion and the occasion offset value may be any one of the following:

combination 1: The actual occasion is the PDCCH monitoring occasion, and the occasion offset value is an occasion offset value of the PDCCH monitoring occasion;

combination 2: The actual occasion is the PDSCH reception occasion, and the occasion offset value is an occasion offset value of a candidate PDSCH reception occasion;

combination 3: The actual occasion is the PDCCH monitoring occasion, and the occasion offset value is an occasion offset value of a candidate PDSCH reception occasion; or combination 4: The actual occasion is the PDSCH reception occasion, and the occasion offset value is an occasion offset value of a PDCCH monitoring occasion.

Optionally, the frequency domain resource is one of the at least two candidate frequency domain resources, and subcarrier spacings of the at least two candidate frequency domain resources are different; and/or at least one actual occasion periodicity on the at least two candidate frequency domain resources is different.

A specific implementation method of the network device shown in FIG. 8 is similar to a specific implementation method of the network device in the method shown in FIG. 4. For details, refer to the description of the method shown in FIG. 4. Details are not described herein again.

Figure 9:
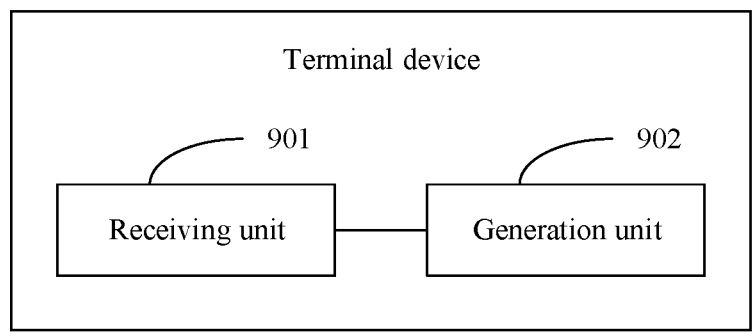
FIG. 9 is a schematic structural diagram of a terminal device according to an embodiment of this application.

FIG. 9 is a schematic structural diagram of a terminal device according to an embodiment of this application. The terminal device includes:

a receiving unit 901, configured to receive at least one downlink transmission and indication information corresponding to the at least one downlink transmission, where the at least one downlink transmission includes a target downlink transmission, the target downlink transmission corresponds to an actual occasion, the target downlink transmission corresponds to a pair of a frequency domain resource and a reference occasion, the reference occasion is an occasion obtained after the actual occasion corresponding to the target downlink transmission is offset by an occasion offset value, and the indication information includes a counter downlink assignment indicator C-DAI, or the indication information includes the C-DAI and a total downlink assignment indicator T-DAI; and a generation unit 902, configured to generate a codebook, where the codebook includes at least one piece of feedback information corresponding to the at least one downlink transmission, and a location, of feedback information corresponding to the target downlink transmission, in the codebook corresponds to indication information that is corresponding to the target downlink transmission.

The actual occasion is a physical downlink control channel PDCCH monitoring occasion at which downlink control information DCI that is used to schedule or carry the target downlink transmission is located, or the actual occasion is a physical downlink shared channel PDSCH reception occasion at which the target downlink transmission is located.

Optionally, the receiving unit 901 is further configured to configure the occasion offset value via higher layer signaling or downlink control information DCI.

Optionally, the pair is a current pair, and a value of a C-DAI corresponding to the target downlink transmission is an accumulative quantity of pairs up to the current pair, and the current pair is a pair of a current reference occasion and a current target frequency domain resource, where the accumulative quantity of pairs is an accumulative quantity of pairs corresponding to the at least one downlink transmission that are sequenced in a first preset order, and the first preset order indicates that the pair is sequenced first in ascending order of frequency domain resource index and then in ascending order of reference occasion index.

Optionally, a value of a T-DAI corresponding to the target downlink transmission is a total quantity of pairs up to the current reference occasion, the total quantity of pairs is a value obtained after a total quantity of pairs corresponding to the target downlink transmission is updated based on a second preset order, and the second preset order is an ascending order of reference occasion index.

Optionally, the reference occasion is earlier than or equal to the actual occasion, or an index of the reference occasion is less than or equal to an index of the actual occasion.

Optionally, the frequency domain resource is one of at least two candidate frequency domain resources, and the occasion offset value is independently configured for each of the at least two candidate frequency domain resources.

Optionally, that the occasion offset value is independently configured for each of the at least two candidate frequency domain resources includes:

the frequency domain resource is a serving cell, and the occasion offset value is independently configured for each of the at least two candidate serving cells; or the frequency domain resource is a carrier bandwidth part C-BWP of a serving cell, and the occasion offset value is independently configured for each of the at least two candidate C-BWPs.

Optionally, the occasion offset value is configured by using any one of the following implementations:

implementation 1: The actual occasion belongs to an actual occasion set, the actual occasion set includes at least two actual occasions, and the occasion offset value is independently configured for each of the at least two actual occasions in the actual occasion set;

implementation 2: The DCI that is used to schedule or carry the target downlink transmission is in one of at least two DCI formats, and the occasion offset value is independently configured for the at least two DCI formats;

implementation 3: A scheduling time interval of the target downlink transmission is one of at least two scheduling time intervals, the occasion offset value is independently configured for the at least two scheduling time intervals, and the scheduling time interval includes a time interval between a downlink transmission to a PDCCH that schedules or carries the downlink transmission;

implementation 4: A feedback time of the target downlink transmission is one of at least two feedback times, the occasion offset value is independently configured for the at least two feedback times, and the feedback time includes a time interval between a downlink transmission to feedback of feedback information corresponding to the downlink transmission; or implementation 5: The downlink transmission is a PDSCH, time domain resource information of the target PDSCH is one of at least two pieces of time domain resource information, the occasion offset value is independently configured, and the time domain resource information includes a time domain length and/or a start symbol location.

Optionally, the occasion offset value is an offset time period, the reference occasion is an occasion obtained after an actual occasion corresponding to the downlink transmission is offset by a quantity of occasions, and the quantity of occasions is a quantity of occasions within the offset time period.

Optionally, a combination of the actual occasion and the occasion offset value may be any one of the following:

combination 1: The actual occasion is the PDCCH monitoring occasion, and the occasion offset value is an occasion offset value of the PDCCH monitoring occasion;

combination 2: The actual occasion is the PDSCH reception occasion, and the occasion offset value is an occasion offset value of a candidate PDSCH reception occasion;

combination 3: The actual occasion is the PDCCH monitoring occasion, and the occasion offset value is an occasion offset value of a candidate PDSCH reception occasion; or combination 4: The actual occasion is the PDSCH reception occasion, and the occasion offset value is an occasion offset value of a PDCCH monitoring occasion.

Optionally, the frequency domain resource is one of the at least two candidate frequency domain resources, and subcarrier spacings of the at least two candidate frequency domain resources are different; and/or at least one actual occasion periodicity on the at least two candidate frequency domain resources is different.

A specific implementation method of the terminal device shown in FIG. 9 is similar to a specific implementation method of the terminal device in the method shown in FIG. 4. For details, refer to the description of the method shown in FIG. 4. Details are not described herein again.

An embodiment of this application further provides a system. The system includes the network device shown in FIG. 8 and the terminal device shown in FIG. 9.

Figure 10:
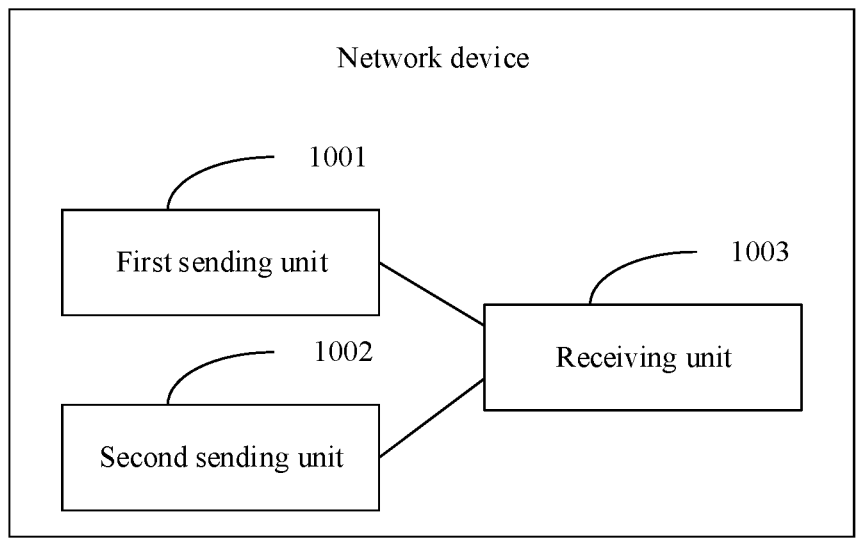
FIG. 10 is a schematic structural diagram of another network device according to an embodiment of this application.

FIG. 10 is a schematic structural diagram of another network device according to an embodiment of this application. The network device includes:

a first sending unit 1001, configured to send at least one first downlink transmission and indication information corresponding to the at least one first downlink transmission, where an actual time domain resource on which the first downlink transmission is located or a reference time domain resource corresponding to the first downlink transmission belongs to a first time domain resource set;

a second sending unit 1002, configured to send at least one second downlink transmission and indication information corresponding to the at least one second downlink transmission, where an actual time domain resource on which the second downlink transmission is located or a reference time domain resource corresponding to the second downlink transmission belongs to a second time domain resource set; and a receiving unit 1003, configured to receive a codebook, where the codebook includes a first sub-codebook and a second sub-codebook, the first sub-codebook includes at least one piece of first feedback information corresponding to the at least one first downlink transmission, the second sub-codebook includes at least one piece of second feedback information corresponding to the at least one second downlink transmission, a location, of the first feedback information corresponding to the first downlink transmission, in the first sub-codebook corresponds to the indication information that is corresponding to the first downlink transmission, and a location, of the second feedback information corresponding to the second downlink transmission, in the second sub-codebook corresponds to the indication information that is corresponding to the second downlink transmission.

Optionally, the first time domain resource set is determined based on an actual subcarrier spacing of a frequency domain resource on which the first downlink transmission is located, the preset first reference subcarrier spacing, and a preset first reference time domain resource set; and/or the second time domain resource set is determined based on an actual subcarrier spacing of a frequency domain resource on which the second downlink transmission is located, the preset first reference subcarrier spacing, and a preset second reference time domain resource set.

Optionally, the reference time domain resource corresponding to the first downlink transmission is determined based on the actual time domain resource on which the first downlink transmission is located, an actual subcarrier spacing of a frequency domain resource on which the first downlink transmission is located, and the preset first reference subcarrier spacing; and/or the reference time domain resource corresponding to the second downlink transmission is determined based on the actual time domain resource on which the second downlink transmission is located, an actual subcarrier spacing of a frequency domain resource on which the second downlink transmission is located, and the preset first reference subcarrier spacing.

Optionally, a time domain resource element in the first time domain resource set is predefined; and a time domain resource element in the second time domain resource set is independently configured.

Optionally, the first sub-codebook is located before the second sub-codebook in the codebook, or the first sub-codebook is located after the second sub-codebook in the codebook.

A specific implementation method of the network device shown in FIG. 10 is similar to a specific implementation method of the network device in the method shown in FIG. 7. For details, refer to the description of the method shown in FIG. 7. Details are not described herein again.

Figure 11:
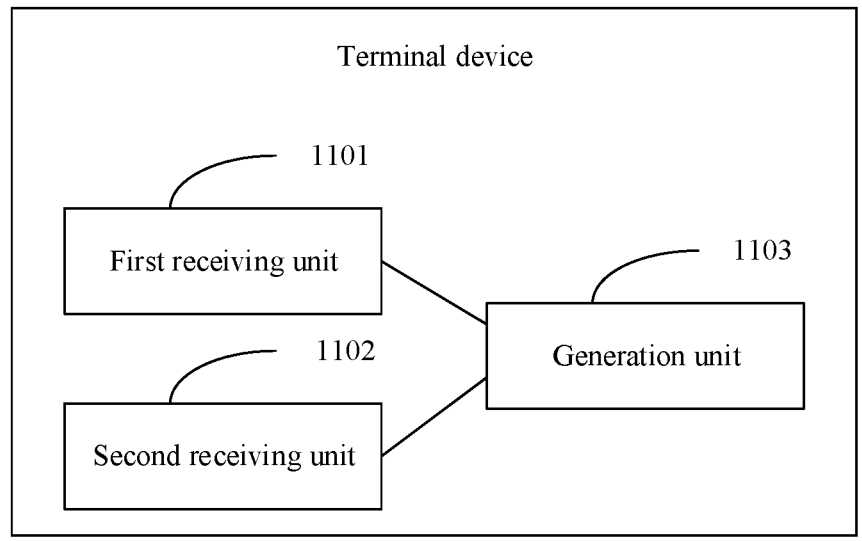
FIG. 11 is a schematic structural diagram of another terminal device according to an embodiment of this application.

FIG. 11 is a schematic structural diagram of another terminal device according to an embodiment of this application. The terminal device includes:

a first receiving unit 1101, configured to receive at least one first downlink transmission and indication information corresponding to the at least one first downlink transmission, where an actual time domain resource on which the first downlink transmission is located or a reference time domain resource corresponding to the first downlink transmission belongs to a first time domain resource set;

a second receiving unit 1102, configured to receive at least one second downlink transmission and indication information corresponding to the at least one second downlink transmission, where an actual time domain resource on which the second downlink transmission is located or a reference time domain resource corresponding to the second downlink transmission belongs to a second time domain resource set; and a generation unit 1103, configured to generate a codebook, where the codebook includes a first sub-codebook and a second sub-codebook, the first sub-codebook includes at least one piece of first feedback information corresponding to the at least one first downlink transmission, the second sub-codebook includes at least one piece of second feedback information corresponding to the at least one second downlink transmission, a location, of the first feedback information corresponding to the first downlink transmission, in the first sub-codebook corresponds to the indication information that is corresponding to the first downlink transmission, and a location, of the second feedback information corresponding to the second downlink transmission, in the second sub-codebook corresponds to the indication information that is corresponding to the second downlink transmission.

Optionally, the first time domain resource set is determined based on an actual subcarrier spacing of a frequency domain resource on which the first downlink transmission is located, the preset first reference subcarrier spacing, and a preset first reference time domain resource set; and/or the second time domain resource set is determined based on an actual subcarrier spacing of a frequency domain resource on which the second downlink transmission is located, the preset first reference subcarrier spacing, and a preset second reference time domain resource set.

Optionally, the reference time domain resource corresponding to the first downlink transmission is determined based on the actual time domain resource on which the first downlink transmission is located, an actual subcarrier spacing of a frequency domain resource on which the first downlink transmission is located, and the preset first reference subcarrier spacing; and/or the reference time domain resource corresponding to the second downlink transmission is determined based on the actual time domain resource on which the second downlink transmission is located, an actual subcarrier spacing of a frequency domain resource on which the second downlink transmission is located, and the preset first reference subcarrier spacing.

Optionally, a time domain resource element in the first time domain resource set is predefined; and a time domain resource element in the second time domain resource set is independently configured.

Optionally, the first sub-codebook is located before the second sub-codebook in the codebook, or the first sub-codebook is located after the second sub-codebook in the codebook.

A specific implementation method of the terminal device shown in FIG. 11 is similar to a specific implementation method of the terminal device in the method shown in FIG. 7. For details, refer to the description of the method shown in FIG. 7. Details are not described herein again.

An embodiment of this application further provides another system. The system includes the network device shown in FIG. 10 and the terminal device shown in FIG. 11.

An embodiment of this application further provides a computer storage medium, where the computer storage medium stores a program, and the program is executed to perform some or all of the steps recorded in the foregoing method embodiments.

A network device provided in an embodiment of this application is described below. The network device includes a processor, a memory, a communications interface, and a bus. The processor, the communications interface, and the memory communicate with one another through the bus. The communications interface is configured to receive and send data. The memory is configured to store an instruction.

The processor is configured to execute the instruction stored in the memory, to perform the foregoing information sending method.

Figure 12:
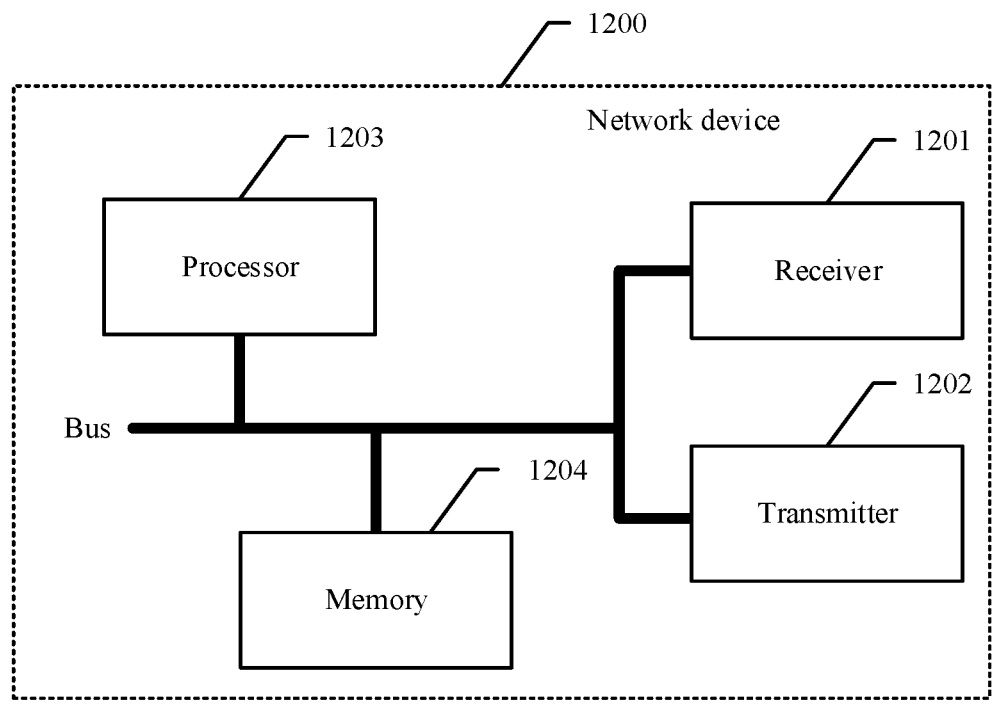
FIG. 12 is a schematic structural diagram of hardware of a network device according to an embodiment of this application.

The network device is described below in detail. Referring to FIG. 12, a network device 1200 includes a receiver 1201, a transmitter 1202, a processor 1203, and a memory 1204 (there may be one or more processors 1203 in the network device 1200, and an example in which there is one processor is used in FIG. 12). The communications interface may include the receiver 1201 and the transmitter 1202. In some embodiments of this application, the receiver 1201, the transmitter 1202, the processor 1203, and the memory 1204 may be connected through a bus or in another manner. In FIG. 12, connection through a bus is used as an example.

The memory 1204 may include a read-only memory and a random access memory, and provide an instruction and data to the processor 1203. A part of the memory 1204 may further include a non-volatile random access memory (NVRAM for short). The memory 1204 stores an operating system and an operation instruction, an executable module or a data structure, a subnet thereof, or an extended set thereof. The operation instruction may include various operation instructions to implement various operations. The operating system may include various system programs, to implement various basic services and process hardware-based tasks.

The processor 1203 controls operations of the network device 1200, and the processor 1203 may also be referred to as a central processing unit (CPU for short). In a specific application, components are coupled together through a bus system. The bus system includes a data bus, and further includes a power bus, a control bus, a status signal bus, and the like. However, for clear description, various types of buses in the figure are referred to as the bus system.

The processor 1203 may be an integrated circuit chip and has a signal processing capability. In an implementation process, steps in the foregoing methods can be implemented by using a hardware integrated logical circuit in the processor 1203, or by using instructions in a form of software. The processor 1203 may be a general purpose processor, a digital signal processor (DSP for short), an application-specific integrated circuit (ASIC for short), a field programmable gate array (FPGA for short) or another programmable logical device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory 1204, and the processor 1203 reads information from the memory 1204 and completes the steps in the foregoing methods in combination with hardware of the processor.

The receiver 1201 may be configured to: receive input digital or character information, and generate a signal input related to a related setting and function control of the network device 1200. The transmitter 1202 may include a display device such as a display screen, and the transmitter 1202 may be configured to output digital or character information by using an external interface.

In this embodiment of this application, the receiver 1201 and the transmitter 1202 are configured to perform the foregoing codebook receiving method performed by a network device side.

Another terminal device provided in an embodiment of this application is described below. The terminal device includes a processor, a memory, a communications interface, and a bus. The processor, the communications interface, and the memory communicate with one another through the bus. The communications interface is configured to receive and send data. The memory is configured to store an instruction. The processor is configured to execute the instruction stored in the memory, to perform the foregoing information receiving method.

Figure 13:
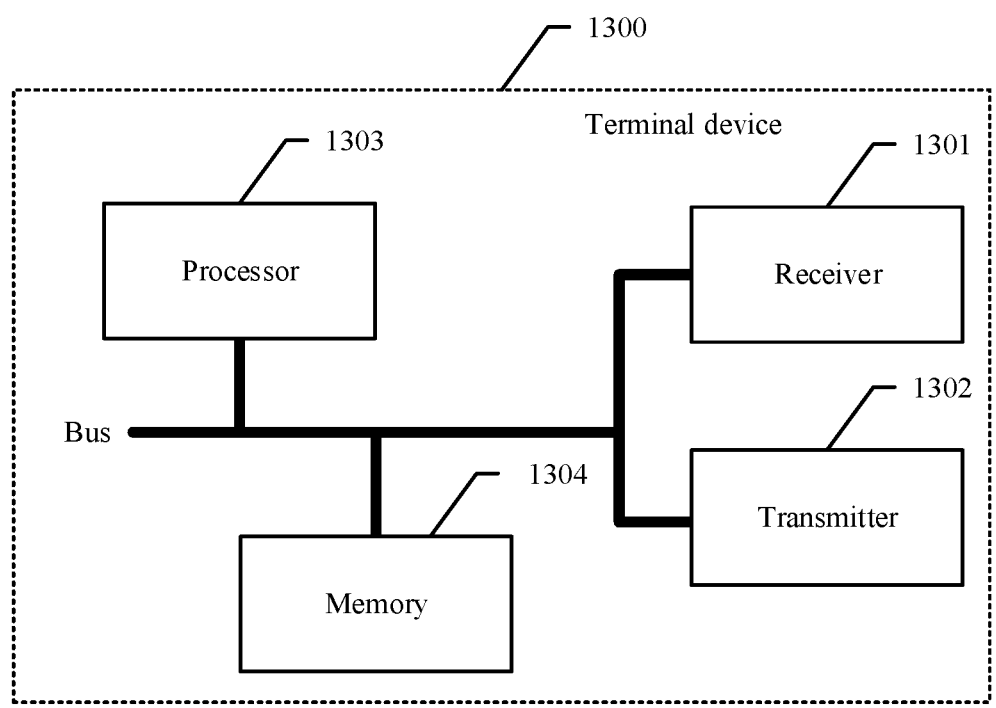
FIG. 13 is a schematic structural diagram of hardware of a terminal device according to an embodiment of this application.

The terminal device is described below in detail. Referring to FIG. 13, a terminal device 1300 includes a receiver 1301, a transmitter 1302, a processor 1303, and a memory 1304 (there may be one or more processors 1303 in the terminal device 1300, and an example in which there is one processor is used in FIG. 13). In some embodiments of this application, the receiver 1301, the transmitter 1302, the processor 1303, and the memory 1304 may be connected through a bus or in another manner. In FIG. 13, connection through a bus is used as an example.

The memory 1304 may include a read-only memory and a random access memory, and provide an instruction and data to the processor 1303. A part of the memory 1304 may further include an NVRAM. The memory 1304 stores an operating system and an operation instruction, an executable module or a data structure, a subnet thereof, or an extended set thereof. The operation instruction may include various operation instructions to implement various operations. The operating system may include various system programs, to implement various basic services and process hardware-based tasks.

The processor 1303 controls an operation of the terminal device 1300. The processor 1303 may also be referred to as a CPU. In a specific application, components of the terminal device 1300 are coupled together through a bus system. The bus system includes a data bus, and further includes a power bus, a control bus, a status signal bus, and the like. However, for clear description, various types of buses in the figure are referred to as the bus system.

The method disclosed in the foregoing embodiments of this application may be applied to the processor 1303, or may be implemented by the processor 1303. The processor 1303 may be an integrated circuit chip and has a signal processing capability. In an implementation process, steps in the foregoing methods can be implemented by using a hardware integrated logical circuit in the processor 1303, or by using instructions in a form of software. The foregoing processor 1303 may be a general purpose processor, a DSP, an ASIC, an FPGA or another programmable logical device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory 1304, and the processor 1303 reads information from the memory 1304 and completes the steps in the foregoing methods in combination with hardware of the processor.

In this embodiment of this application, the receiver 1301 and the processor 1303 are configured to perform the foregoing codebook generation method performed by the terminal device.

In the embodiments of this application, the embodiments are described with reference to a network device and a terminal device.

The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in a wireless local area network (WLAN), or may be a cellular phone, a cordless phone, a session initiation protocol (SIP) phone, a wireless local loop (WLL) station, a personal digital assistant (PDA) device, a handheld device having a wireless communication function, a computing device, or another processing device connected to a wireless modem, a vehicle-mounted device, a wearable device, a terminal device in a next-generation communications system, for example, a 5th generation (5G) communications network, a terminal device in a future evolved public land mobile network (PLMN) network, a terminal device in a new radio (NR) communications system, or the like.

As an example instead of a limitation, the terminal device in the embodiments of this application may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that can be directly worn on a body or integrated into clothes or an accessory of a user. The wearable device is not merely a hardware device, but is used to implement a powerful function through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with other devices such as smartphones, for example, various smart bands or smart jewelry for monitoring physical signs.

In addition, the network device may be a device configured to communicate with a mobile device. The network device may be an access point (AP) in a WLAN, a base transceiver station (BTS) in GSM or CDMA, or a NodeB (NB) in WCDMA, or an evolved NodeB (eNB or eNodeB) in LTE, or may be a relay station or an access point, a vehicle-mounted device, a wearable device, a network device in a future 5G network, a network device in a future evolved PLMN network, a next-generation NodeB (gNodeB) in an NR system, or the like.

In addition, in the embodiments of this application, the network device provides a service for a cell, and the terminal device communicates with the network device by using a transmission resource (for example, a frequency domain resource or a spectrum resource) used by the cell. The cell may be a cell corresponding to the network device (for example, a base station). The cell may belong to a macro base station, or may belong to a base station corresponding to a small cell. The small cell herein may include: a metro cell, a micro cell, a pico cell, a femto cell, and the like. These small cells have characteristics of small coverage and low transmit power, and are applicable to providing a high-rate data transmission service.

In addition, in the LTE system or the NR system, a plurality of cells may simultaneously work on a carrier at a same frequency. In some special scenarios, it may also be considered that a concept of the carrier is equivalent to a concept of the cell. For example, in a carrier aggregation (CA) scenario, when a secondary component carrier is configured for UE, a carrier index of the secondary component carrier and a cell identity (Cell ID) of a secondary serving cell operating on the secondary component carrier are both carried. In this case, it may be considered that a concept of the carrier is equivalent to a concept of a cell. For example, access by the UE to a carrier is equivalent to access to a cell.

A method and an apparatus that are provided in the embodiments of this application may be applied to the terminal device or the network device. The terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, contacts, word processing software, and instant messaging software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the execution body of the method provided in the embodiments of this application may be the terminal device or the network device, or a function module that can invoke and execute the program in the terminal device or the network device.

In addition, aspects or features in the embodiments of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a compact disc (CD), a digital versatile disc (DVD), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, contain, and/or transmit an instruction and/or data.

The foregoing descriptions are merely preferred implementations of this application. It should be noted that a person of ordinary skill in the art may make several improvements or polishing without departing from the principle of this application and the improvements or polishing shall fall within the protection scope of this application.

What is claimed is:

1. A method comprising:
    receiving, by a terminal device, at least one downlink transmission and indication information corresponding to the at least one downlink transmission, wherein the at least one downlink transmission comprises a target downlink transmission corresponding to an actual occasion and a pair of a target frequency domain resource and a reference occasion, wherein the reference occasion is obtained after the actual occasion is offset by an occasion offset value, and wherein the indication information comprises one of a counter downlink assignment indicator (C-DAI) or a combination of the C-DAI and a total downlink assignment indicator (T-DAI), and wherein the C-DAI corresponds to the target downlink transmission and a value of the C-DAI indicates an accumulative quantity of a plurality of pairs of frequency domain resources and reference occasions; and
    generating, by the terminal device, a codebook that comprises at least one piece of feedback information corresponding to the at least one downlink transmission, wherein a location of feedback information corresponding to the target downlink transmission in the codebook corresponds to indication information corresponding to the target downlink transmission,
    wherein the actual occasion comprises one of:
        a physical downlink control channel (PDCCH) monitoring occasion at which downlink control information (DCI) for scheduling or carrying the target downlink transmission is located, or
        a physical downlink shared channel (PDSCH) reception occasion at which the target downlink transmission is located.

2. The method of claim 1, further comprising:
    receiving, by the terminal device, the occasion offset value via higher layer signaling or the DCI, wherein the higher layer signaling comprises one of RRC signaling or MAC signaling.

3. The method of claim 1, further comprising:
    sending, by a network device, the at least one downlink transmission and the indication information corresponding to the at least one downlink transmission to the terminal device; and
    receiving, by the network device, the codebook from the terminal device.

4. The method of claim 3, further comprising:
    configuring, by the network device, the occasion offset value via higher layer signaling or the DCI, wherein the higher layer signaling comprises one of RRC signaling or MAC signaling.

5. The method of claim 1, wherein the pair of the target frequency domain resource and the reference occasion is a current pair of a current target frequency domain resource and a current reference occasion,
    wherein the plurality of pairs range from an initial pair of a frequency domain resource and a reference occasion to the current pair of a current target frequency domain resource and a current reference occasion, the pairs corresponding to the at least one downlink transmission and being sequenced in a first preset order, and
    wherein the first preset order indicates that the pairs are sequenced first in an ascending order of frequency domain resource index and then in an ascending order of reference occasion index.

6. The method of claim 1, wherein the pair of the target frequency domain resource and the reference occasion is a current pair of a current target frequency domain resource and a current reference occasion,
    wherein a value of a T-DAI corresponding to the target downlink transmission is a total quantity of a plurality of pairs of a frequency domain resource and a reference occasion, wherein the plurality of pairs range from an initial pair of a frequency domain resource and a reference occasion to the current pair of a current target frequency domain resource and a current reference occasion, and
    wherein the total quantity of pairs is a value obtained after a total quantity of pairs corresponding to the target downlink transmission is updated based on a second preset order, the second preset order being an ascending order of reference occasion index.

7. The method of claim 1, wherein the reference occasion is earlier than or equal to the actual occasion.

8. The method of claim 1, wherein the target frequency domain resource comprises one of at least two candidate frequency domain resources, and
    wherein the method further comprises:
        configuring the occasion offset value independently for each of the at least two candidate frequency domain resources.

9. The method of claim 8, wherein configuring the occasion offset value independently for each of the at least two candidate frequency domain resources comprises one of:
    in response to determining that the frequency domain resource is a serving cell, configuring the occasion offset value independently for each of at least two candidate serving cells; or
    in response to determining that the frequency domain resource is a carrier bandwidth part (C-BWP) of a serving cell, configuring the occasion offset value independently for each of at least two candidate C-BWPs.

10. The method of claim 1, further comprising one of:
    configuring the occasion offset value independently for each of at least two actual occasions in an actual occasion set, wherein the actual occasion belongs to the actual occasion set;
    configuring the occasion offset value independently for each of at least two DCI formats, wherein the DCI is in one of the at least two DCI formats;
    configuring the occasion offset value independently for each of at least two scheduling time intervals, wherein a scheduling time interval of the target downlink transmission is one of the at least two scheduling time intervals, and the scheduling time interval comprises a time interval of a downlink transmission to a PDCCH that schedules or carries the downlink transmission;
    configuring the occasion offset value independently for each of at least two feedback times, wherein a feedback time of the target downlink transmission is one of the at least two feedback times, and the feedback time comprises a time interval of a downlink transmission to a feedback of feedback information corresponding to the downlink transmission; or
    configuring the occasion offset value independently for each of at least two pieces of time domain resource information, wherein the target downlink transmission is a target PDSCH, and time domain resource information of the target PDSCH is one of the at least two pieces of time domain resource information, and wherein the time domain resource information comprises at least one of a time domain length or a start symbol location.

11. The method of claim 1, wherein the occasion offset value is an offset time period, and
wherein the reference occasion is an occasion obtained after the actual occasion corresponding to the target downlink transmission is offset by a quantity of occasions within the offset time period.

12. The method of claim 1, wherein a combination of the actual occasion and the occasion offset value comprises one of:
the actual occasion being the PDCCH monitoring occasion and the occasion offset value being an occasion offset value of the PDCCH monitoring occasion;
the actual occasion being the PDSCH reception occasion and the occasion offset value being an occasion offset value of a candidate PDSCH reception occasion;
the actual occasion being the PDCCH monitoring occasion and the occasion offset value being an occasion offset value of a candidate PDSCH reception occasion; or
the actual occasion being the PDSCH reception occasion, and the occasion offset value being an occasion offset value of a PDCCH monitoring occasion.

13. The method of claim 1, wherein the target frequency domain resource is one of at least two candidate frequency domain resources, and
wherein the at least two candidate frequency domain resources have at least one of different subcarrier spacings or at least one different actual occasion periodicity.

14. A method comprising:
receiving, by a terminal device, at least one first downlink transmission and indication information corresponding to the at least one first downlink transmission, wherein a first time domain resource set comprises at least one of an actual time domain resource on which a first target downlink transmission is located or a reference time domain resource corresponding to the first target downlink transmission;
receiving, by the terminal device, at least one second downlink transmission and indication information corresponding to the at least one second downlink transmission, wherein a second time domain resource set comprises at least one of an actual time domain resource on which a second target downlink transmission is located or a reference time domain resource corresponding to the second target downlink transmission, wherein the indication information corresponding to the at least one first downlink transmission and the indication information corresponding to the at least one second downlink transmission comprise one of a counter downlink assignment indicator (C-DAI) or a combination of the C-DAI and a total downlink assignment indicator (T-DAI), and wherein the C-DAI corresponds to a corresponding target downlink transmission and a value of the C-DAI indicates an accumulative quantity of a plurality of pairs of frequency domain resources and reference occasions; and
generating, by the terminal device, a codebook that comprises a first sub-codebook and a second sub-codebook, wherein the first sub-codebook comprises at least one piece of first feedback information corresponding to the at least one first downlink transmission, and the second sub-codebook comprises at least one piece of second feedback information corresponding to the at least one second downlink transmission, and
wherein a location of the first feedback information corresponding to the first target downlink transmission in the first sub-codebook corresponds to the indication information corresponding to the first target downlink transmission, and wherein a location of the second feedback information corresponding to the second target downlink transmission in the second sub-codebook corresponds to the indication information corresponding to the second target downlink transmission.

15. The method of claim 14, further comprising:
sending, by a network device, the at least one first downlink transmission and the indication information corresponding to the at least one first downlink transmission to the terminal device;
sending, by the network device, the at least one second downlink transmission and the indication information corresponding to the at least one second downlink transmission to the terminal device; and
receiving, by the network device, the codebook from the terminal device.

16. The method of claim 14, further comprising at least one of:
determining the first time domain resource set based on an actual subcarrier spacing of a frequency domain resource on which the first downlink transmission is located, a preset first reference subcarrier spacing, and a preset first reference time domain resource set; or
determining the second time domain resource set based on an actual subcarrier spacing of a frequency domain resource on which the second downlink transmission is located, the preset first reference subcarrier spacing, and a preset second reference time domain resource set.

17. The method of claim 14, further comprising at least one of:
determining the reference time domain resource corresponding to the first downlink transmission based on the actual time domain resource on which the first downlink transmission is located, an actual subcarrier spacing of a frequency domain resource on which the first downlink transmission is located, and a preset first reference subcarrier spacing; or
determining the reference time domain resource corresponding to the second downlink transmission based on the actual time domain resource on which the second downlink transmission is located, an actual subcarrier spacing of a frequency domain resource on which the second downlink transmission is located, and the preset first reference subcarrier spacing.

18. The method of claim 14, wherein a time domain resource element in the first time domain resource set is predefined, and
wherein a time domain resource element in the second time domain resource set is independently configured.

19. A terminal device comprising:
at least one processor; and
at least one non-transitory computer-readable storage medium coupled to the at least one processor and storing programming instructions for execution by the at least one processor, wherein the programming instructions instruct the at least one processor to perform one or more operations comprising:

receiving at least one downlink transmission and indication information corresponding to the at least one downlink transmission, wherein the at least one downlink transmission comprises a target downlink transmission corresponding to an actual occasion and a pair of a target frequency domain resource and a reference occasion, wherein the reference occasion is obtained after the actual occasion corresponding to the target downlink transmission is offset by an occasion offset value, and wherein the indication information comprises one of a counter downlink assignment indicator (C-DAI) or a combination of the C-DAI and a total downlink assignment indicator (T-DAI), and wherein the C-DAI corresponds to the target downlink transmission and a value of the C-DAI indicates an accumulative quantity of a plurality of pairs of frequency domain resources and reference occasions; and generating a codebook that comprises at least one piece of feedback information corresponding to the at least one downlink transmission, wherein a location of feedback information corresponding to the target downlink transmission in the codebook corresponds to indication information corresponding to the target downlink transmission, wherein the actual occasion comprises one of:
  a physical downlink control channel (PDCCH) monitoring occasion at which downlink control information (DCI) for scheduling or carrying the target downlink transmission is located, or
  a physical downlink shared channel (PDSCH) reception occasion at which the target downlink transmission is located.

20. The terminal device of claim 19, wherein the operations further comprises:
  receiving at least one first downlink transmission and indication information corresponding to the at least one first downlink transmission, wherein a first time domain resource set comprises at least one of an actual time domain resource on which the first downlink transmission is located or a reference time domain resource corresponding to the first downlink transmission;
  receiving at least one second downlink transmission and indication information corresponding to the at least one second downlink transmission, wherein a second time domain resource set comprises at least one of an actual time domain resource on which the second downlink transmission is located or a reference time domain resource corresponding to the second downlink transmission; and
  generating a second codebook that comprises a first sub-codebook and a second sub-codebook,
  wherein the first sub-codebook comprises at least one piece of first feedback information corresponding to the at least one first downlink transmission, and the second sub-codebook comprises at least one piece of second feedback information corresponding to the at least one second downlink transmission, and
  wherein a location of the first feedback information corresponding to the first downlink transmission in the first sub-codebook corresponds to the indication information corresponding to the first downlink transmission, and wherein a location of the second feedback information corresponding to the second downlink transmission in the second sub-codebook corresponds to the indication information corresponding to the second downlink transmission.

* * * * *